United States Patent
Sjödin et al.

(10) Patent No.: US 10,131,011 B2
(45) Date of Patent: Nov. 20, 2018

(54) METHOD FOR JOINING METAL PARTS

(71) Applicant: ALFA LAVAL CORPORATE AB, Lund (SE)

(72) Inventors: Per Sjödin, Lund (SE); Kristian Walter, Genarp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 418 days.

(21) Appl. No.: 14/388,262

(22) PCT Filed: Mar. 27, 2013

(86) PCT No.: PCT/EP2013/056530
§ 371 (c)(1),
(2) Date: Sep. 26, 2014

(87) PCT Pub. No.: WO2013/144211
PCT Pub. Date: Oct. 3, 2013

(65) Prior Publication Data
US 2015/0044501 A1 Feb. 12, 2015

(30) Foreign Application Priority Data
Mar. 28, 2012 (EP) .................................... 12161742

(51) Int. Cl.
*B23K 1/20* (2006.01)
*B23K 35/22* (2006.01)
(Continued)

(52) U.S. Cl.
CPC ............... *B23K 1/20* (2013.01); *B21D 53/04* (2013.01); *B23K 1/00* (2013.01); *B23K 1/0008* (2013.01);
(Continued)

(58) Field of Classification Search
None
See application file for complete search history.

(56) References Cited

U.S. PATENT DOCUMENTS

| | | | |
|---|---|---|---|
| 3,073,269 A | 1/1963 | Hoppin, III et al. | |
| 4,005,988 A * | 2/1977 | Paulonis | B23K 20/233 |
| | | | 428/652 |

(Continued)

FOREIGN PATENT DOCUMENTS

| | | |
|---|---|---|
| CN | 1198116 A | 11/1998 |
| CN | 1343300 A | 4/2002 |

(Continued)

OTHER PUBLICATIONS

Wu et al., "Evaluation of TLP bonding between nickel-based superalloys", Journal of Materials Science, issue 36, 2001, p. 1539-1546.*

(Continued)

*Primary Examiner* — Devang R Patel
(74) *Attorney, Agent, or Firm* — Birch, Stewart, Kolasch & Birch, LLP

(57) ABSTRACT

A method for joining a first metal part (11) with a second metal part (12), the metal parts (11,12) having a solidus temperature above 1100 QC. The method comprises: applying a melting depressant composition (14) on a surface (15) of the first metal part (11), the melting depressant composition (14) comprising a melting depressant component that comprises at least 25 wt % boron and silicon for decreasing a melting temperature of the first metal part (11); bringing (202) the second metal part (12) into contact with the melting depressant composition (14) at a contact point (16) on said surface (15); heating the first and second metal parts (11,12) to a temperature above 1100 QC; and allowing a melted metal layer (210) of the first metal component (11) to (Continued)

solidify, such that a joint (25) is obtained at the contact point (16). The melting depressant composition and related products are also described.

24 Claims, 9 Drawing Sheets

(51) Int. Cl.
| | |
|---|---|
| C22C 19/00 | (2006.01) |
| B23K 35/365 | (2006.01) |
| B23K 35/00 | (2006.01) |
| B23K 35/02 | (2006.01) |
| C22C 1/02 | (2006.01) |
| B23K 1/00 | (2006.01) |
| B23K 35/24 | (2006.01) |
| B23K 35/34 | (2006.01) |
| B23K 35/362 | (2006.01) |
| C23C 30/00 | (2006.01) |
| B21D 53/04 | (2006.01) |
| F28D 9/00 | (2006.01) |
| B32B 15/01 | (2006.01) |
| C23C 24/10 | (2006.01) |
| B23K 20/00 | (2006.01) |
| B23K 20/24 | (2006.01) |
| B23K 35/36 | (2006.01) |
| B23K 101/00 | (2006.01) |
| F28F 3/04 | (2006.01) |
| F28F 21/08 | (2006.01) |

(52) U.S. Cl.
CPC ............ *B23K 1/0012* (2013.01); *B23K 1/203* (2013.01); *B23K 20/002* (2013.01); *B23K 20/24* (2013.01); *B23K 35/00* (2013.01); *B23K 35/001* (2013.01); *B23K 35/004* (2013.01); *B23K 35/007* (2013.01); *B23K 35/02* (2013.01); *B23K 35/025* (2013.01); *B23K 35/0244* (2013.01); *B23K 35/24* (2013.01); *B23K 35/34* (2013.01); *B23K 35/36* (2013.01); *B23K 35/362* (2013.01); *B23K 35/365* (2013.01); *B23K 35/3613* (2013.01); *B32B 15/01* (2013.01); *C22C 1/02* (2013.01); *C22C 19/00* (2013.01); *C23C 24/10* (2013.01); *C23C 30/00* (2013.01); *C23C 30/005* (2013.01); *F28D 9/0062* (2013.01); *B23K 2101/00* (2018.08); *F28D 9/0012* (2013.01); *F28F 3/042* (2013.01); *F28F 21/083* (2013.01); *F28F 21/089* (2013.01); *Y10T 29/49366* (2015.01); *Y10T 403/479* (2015.01); *Y10T 428/12778* (2015.01); *Y10T 428/12986* (2015.01); *Y10T 428/25* (2015.01); *Y10T 428/259* (2015.01); *Y10T 428/266* (2015.01); *Y10T 428/273* (2015.01); *Y10T 428/2924* (2015.01); *Y10T 428/2982* (2015.01)

(56) References Cited

U.S. PATENT DOCUMENTS

| | | | |
|---|---|---|---|
| 4,614,296 A | 9/1986 | Lesgourgues | |
| 5,221,039 A | 6/1993 | Jung et al. | |
| 5,273,708 A * | 12/1993 | Freeman | C23C 4/02 |
| | | | 419/35 |
| 5,318,217 A * | 6/1994 | Stinson | C23C 4/02 |
| | | | 228/194 |
| 5,849,080 A | 12/1998 | Okuno | |
| 5,919,577 A | 7/1999 | Hasegawa et al. | |
| 6,098,871 A * | 8/2000 | Cairo | B23K 11/16 |
| | | | 228/193 |
| 6,109,505 A | 8/2000 | Malie et al. | |
| 6,394,179 B1 | 5/2002 | Blomgren et al. | |
| 6,708,869 B2 | 3/2004 | Hyogo et al. | |
| 7,565,996 B2 * | 7/2009 | Das | B23K 20/02 |
| | | | 228/246 |
| 2002/0104875 A1* | 8/2002 | Stueber | B23K 20/002 |
| | | | 228/194 |
| 2003/0200835 A1 | 10/2003 | Malie et al. | |
| 2009/0026182 A1 | 1/2009 | Hu et al. | |
| 2009/0305078 A1 | 12/2009 | Sjodin | |
| 2010/0038410 A1 | 2/2010 | Mchale et al. | |
| 2010/0055495 A1 | 3/2010 | Sjödin | |
| 2011/0014491 A1* | 1/2011 | Mars | B23K 35/3053 |
| | | | 428/615 |
| 2011/0024096 A1* | 2/2011 | Christensen | F28D 9/005 |
| | | | 165/166 |
| 2013/0084467 A1 | 4/2013 | Sjödin | |

FOREIGN PATENT DOCUMENTS

| | | |
|---|---|---|
| CN | 101588890 A | 11/2009 |
| CN | 101605628 A | 12/2009 |
| EP | 1982781 A1 | 10/2008 |
| JP | 63-140781 A | 6/1988 |
| JP | 64-78688 A | 3/1989 |
| JP | 6-234082 A | 8/1994 |
| JP | 9-183606 A | 7/1997 |
| JP | 2000-61653 A | 2/2000 |
| JP | 2000-225491 A | 8/2000 |
| JP | 2002-361479 A | 12/2002 |
| JP | 2003-251471 A | 9/2003 |
| JP | 2009-192191 A | 8/2009 |
| JP | 2010-510067 A | 4/2010 |
| KR | 10-2008-0015871 A | 2/2008 |
| KR | 10-2009-0084942 A | 8/2009 |
| RU | 2 167 751 C2 | 5/2001 |
| SU | 659326 A | 4/1979 |
| WO | WO 96/37335 A1 | 11/1996 |
| WO | WO 2006/126953 A1 | 11/2006 |
| WO | WO 2008/060225 A1 | 5/2008 |
| WO | WO 2008/060226 A2 | 5/2008 |
| WO | WO 2013/144210 A1 | 10/2013 |
| WO | WO 2013/144216 A1 | 10/2013 |
| WO | WO 2013/144222 A1 | 10/2013 |

OTHER PUBLICATIONS

ASM International, "Principles of Brazing", Chapter 6—Diffusion Brazing, 2005, p. 207-220.*
English translation of the Russian Decision on Grant, dated Mar. 22, 2016, for corresponding Russian Application No. 2014143186/02.
International Search Report, issued in PCT/EP2013/056530, dated Jul. 25, 2013.
Written Opinion of the International Searching Authority, issued in PCT/EP2013/056530, dated Jul. 25, 2013.
English translation of the Korean Office Action dated Nov. 4, 2015, for Korean Application No. 10-2014-7026387.
"Welding Handbook: Welding of Materials," Welding Society of Chinese Mechanical Engineering Society, China Machine Press, 3rd ed., vol. 2, Jan. 31, 2008, pp. 407-421 (17 pages).
English translation of the Chinese Office Action and Search Report, dated Oct. 29, 2015, for Chinese Application No. 201380016830.7.
English translation of a Japanese Office Action, dated Nov. 30, 2015, for Japanese Application No. 2015-502323.
English translation of a Japanese Office Action, dated Oct. 6, 2017, for Japanese Application No. 2016-216280.
Malaysian Search Report for Malaysian Application No. PI2014702788, dated Jul. 16, 2018.
English translation of the Japanese Office Action, dated Apr. 23, 2018, for Japanese Application No. 2016-216280.

* cited by examiner

METHOD FOR JOINING METAL PARTS

TECHNICAL FIELD

The invention relates to a method for joining a first metal part with a second metal part by using a melting depressant composition. The invention also relates to the melting depressant composition and to products that comprise the joined metal parts.

BACKGROUND ART

Today there are different joining methods for joining metal parts (metal objects or metal workpieces) that are made of metallic elements, which metallic elements include various elemental metals as well as various metallic alloys. The metal parts in question have, by virtue of the metallic elements or alloys they are made of, a melting temperature of at least 1100° C., which means that the metal parts cannot be made of e.g. pure copper, pure aluminum or various aluminum-based alloys. Some examples of metal the metal parts may be made of are typically iron-, nickel- and cobalt-based alloys.

One common method for joining such metal parts is welding which is a method where the metal in the metal part with or without additional material is melted, i.e. a cast product is formed by melting and subsequent re-solidification.

Another joining method is brazing which is a metal-joining process where a filler metal first is applied on at least one of two metal parts to be joined and then heated above its melting point and distributed between the metal parts by capillary action. The filler metal is brought above its melting temperature, typically under protection by a suitable atmosphere. The filler metal then flows over the metal parts towards contact points where it forms joints.

Generally, when brazing, a filler metal is applied in contact with a gap or a clearance between the metal parts to be joined. During the heating process the filler metal melts and fills the gap to be joined. In the brazing process there are three major stages where the first stage is called the physical stage. The physical stage includes wetting and flowing of the filler metal. The second stage normally occurs at a given joining temperature. During this stage there is solid-liquid interaction, which is accompanied by substantial mass transfer. A small volume of the metal parts that immediately adjoins the liquid filler metal either dissolves or is reacted with the filler metal in this stage. At the same time a small amount of elements from the liquid phases penetrates into the solid metal parts. This redistribution of components in the joint area results in changes to the filler metal composition, and sometimes, the onset of solidification of the filler metal. The last stage, which overlaps the second, is characterized by the formation of the final joint microstructure and progresses during solidification and cooling of the joint. The volume of the metal parts that adjoins the liquid filler metal is very small, i.e. the joint is formed to the largest extent by the filler metal. Generally, when brazing, at least 95% of the metal in the joint comes from the filler metal.

Another method for joining two metal parts (parent materials) is transient liquid phase diffusion bonding (TLP bonding) where diffusion occurs when a melting point depressant element from an interlayer moves into lattice and grain boundaries of the metal parts at the bonding temperature. Solid state diffusional processes then lead to a change of composition at the bond interface and the dissimilar interlayer melts at a lower temperature than the parent materials. Thus a thin layer of liquid spreads along the interface to form a joint at a lower temperature than the melting point of either of the metal parts. A reduction in bonding temperature leads to solidification of the melt, and this phase can subsequently be diffused away into the metal parts by holding at bonding temperature for a period of time.

Joining methods such as welding, brazing and TLP-bonding successfully joins metal parts. However, welding has its limitations as it may be very expensive or even impossible create a large number of joints when they are hard to access. Brazing has also its limitations, for example in that it sometimes it is hard to properly apply or even determine a most suitable filler metal. TLP-bonding as advantageous when it comes to joining different material but has its limitations. For example, it is often hard to find a suitable interlayer and the method is not really suitable for creating a joint where a large gaps is to be filled or when a relatively large joint is to be formed.

Thus, many factors are involved when selecting a certain joining method. Factors that also are crucial are cost, productivity, safety, process speed and properties of the joint that joins the metal parts as well as properties of the metal parts per se after the joining. Even though the aforementioned methods have their advantages, there is still a need for a joining method to be used as a complement to the present methods, in particular if factors like cost, productivity, safety and process speed are taken into account.

SUMMARY

It is an object of the invention to improve the above techniques and the prior art. In particular, it is an object to provide a method for joining metal parts (metal workpieces, i.e. workpieces or objects that are made of metal) in a simple and reliable manner while still producing a strong joint between the metal parts.

To solve these objects a method of for joining a first metal part with a second metal part is provided. The method is used for metal parts that have a solidus temperature above 1100° C. The method comprises:

applying a melting depressant composition on a surface of the first metal part, the melting depressant composition comprising a melting depressant component that comprises at least 25 wt % boron and silicon for decreasing a melting temperature of the first metal part, and optionally, a binder component for facilitating the applying of the melting depressant composition on the surface;

bringing the second metal part into contact with the melting depressant composition at a contact point on said surface;

heating the first and second metal parts to a temperature above 1100° C., said surface of the first metal part thereby melting such that a surface layer of the first metal part melts and, together with the melting depressant component, forms a melted (molten) metal layer that is in contact with the second metal part at the contact point; and allowing the melted metal layer to solidify, such that a joint is obtained at the contact point.

The metal in the metal parts may have the form of e.g. iron-, nickel and cobalt-based metallic alloys, as they typically have a solidus temperature above 1100° C. The metal parts may not be pure copper, copper-based alloys, pure aluminum or aluminum-based alloys that do not have a solidus temperature above 1100° C. The metal in the metal part or even the metal part per se may be referred to as the "parent metal" or "parent material". In this context, an "iron-based" alloy is an alloy where iron has the largest weight percentage of all elements in the alloy (wt %). The corresponding situation also applies for nickel-, cobalt-, chromium- and aluminum-based alloys.

As indicated, the melting depressant composition comprises at least one component, which is the melting depressant component. Optionally, the melting depressant composition comprises a binder component. All substances or parts of the melting depressant composition that contributes to decreasing a melting temperature of at least the first metal part is considered to be part of the melting depressant component. Parts of the melting depressant composition that are not involved in decreasing a melting temperature of at least the first metal part but instead "binds" the melting depressant composition, such that it forms e.g. a paste, paint or slurry, is considered to be part of the binder component. Of course, the melting depressant component may include other components, such as small amounts of filler metal. However, such filler metal may not represent more than 75 wt % of the melting depressant component, since at least 25 wt % of the melting depressant component comprises boron and silicon. If a filer metal is included in the melting depressant composition, it is always part of the melting depressant component.

In this context, "boron and silicon" means the sum of boron and silicon in the melting depressant component, as calculated in wt %. Here, wt % means weight percentage which is determined by multiplying mass fraction by 100. As is known, mass fraction of a substance in a component is the ratio of the mass concentration of that substance (density of that substance in the component) to the density of the component. Thus, for example, at least 25 wt % boron and silicon means that the total weight of boron and silicon is at least 25 g. in a sample of 100 g melting depressant component. Obviously, if a binder component is comprised in the melting depressant composition, then the wt % of boron and silicon in the melting depressant composition may be less than 25 wt %. However, at least 25 wt % boron and silicon are always present in the melting depressant component, which, as indicated, also includes any filler metal that may be included, i.e. filler metal is always seen as part of the melting depressant composition.

The "boron" includes all boron in the melting depressant component, which includes elemental boron as well as boron in a boron compound. Correspondingly, the "silicon" includes all silicon in the melting depressant component, which includes elemental silicon as well as silicon in a silicon compound. Thus, both the boron and silicon may, in the melting depressant component, be represented by the boron and silicon in various boron and silicon compounds.

Obviously, the melting depressant composition is very different from conventional brazing substances since they have much more filling metal relative melting depressing substances like boron and silicon. Generally, brazing substances have less than 18 wt % boron and silicon.

The method is advantageous in that filler metal may be reduced or even excluded and in that it may be applied for metal parts that are made of different materials. It may also be used within a wide range of applications, for example for joining heat transfer plates or any suitable metal objects that otherwise are joined by e.g. welding or conventional brazing.

Of course, the melting depressant composition may be applied on the second metal part as well.

The boron may originate from any of elemental boron and boron of a boron compound selected from at least any of the following compounds: boron carbide, silicon boride, nickel boride and iron boride. The silicon may originate from any of elemental silicon and silicon of a silicon compound selected from at least any of the following compounds: silicon carbide, silicon boride and ferrosilicon.

The melting depressant component may comprise at least 40 wt % boron and silicon, or may even comprise at least 85 wt % boron and silicon. This means that if any filler metal is present it is present in amounts of less than 60 wt % respectively less than 15 wt %. The melting depressant component may even comprise at least 95 wt % boron and silicon.

Boron may constitute at least 10 wt % of the boron and silicon content of the melting depressant compound. This means that, when the melting depressant component comprise at least 25 wt % boron and silicon, then the melting depressant component comprises at least at least 2.5 wt % boron. Silicon may constitute at least 55 wt % of the boron and silicon content of the melting depressant compound.

The melting depressant component may comprise less than 50 wt % metallic elements, or less than 10 wt % metallic elements. Such metallic elements corresponds to the "metal filler" discussed above. Such small amounts of metallic elements or metal filler differentiates the melting depressant composition starkly from e.g. known brazing compositions since they comprise at least 60 wt % metallic elements. Here, "metallic elements" include e.g. all transition metals, which are the elements in the d-block of the periodic table, which includes groups 3 to 12 on the periodic table. This means that, for example, iron (Fe), nickel (Ni), cobalt (Co), chromium (Cr) and molybdenum (Mo) are "metallic elements. Elements that are not "metallic elements" are the noble gases, the halogens and the following elements: boron (B), carbon (C), silicon (Si), nitrogen (N), phosphorus (P), arsenic (As), oxygen (O), sulfur (S), selenium (Se) and tellurium (Tu). It should be noted that, for example, if the boron comes from the compound nickel boride, then the nickel-part of this compound is a metallic element that is included in the metallic elements that in one embodiment should be less than 50 wt % and in the other embodiment less than 10 wt %.

The first metal part may comprise a thickness of 0.3-0.6 mm and the applying of the melting depressant composition may then comprise applying an average of 0.02-0.12 mg boron and silicon per $mm^2$ on the surface of the first metal part. The applying of an average of 0.02-0.12 mg boron and silicon per $mm^2$ on the surface of the first metal part includes any indirect application via e.g. the second metal part, for example boron and silicon that is transferred from the second metal part to the first metal part. Thus, the boron and silicon referred to herein must not necessarily have been applied directly on the first metal part, as long as it still contributes to the melting of the surface layer of the first metal part.

The first metal part may comprise a thickness of 0.6-1.0 mm and the applying of the melting depressant composition may then comprise applying an average of 0.02-1.0 mg boron and silicon per $mm^2$ on the surface of the first metal part. As before, the application includes also indirect "application" via the second metal part.

The first metal part may comprise a thickness of more than 1.0 mm and the applying of the melting depressant composition may then comprise applying an average of 0.02-5.0 mg boron and silicon per $mm^2$ on the surface of the first metal part.

The surface may have an area that is larger than an area defined by the contact point on said surface part, such that metal in the melted metal layer flows to the contact point when allowing the joint to form. Such flow is typically caused by capillary action.

The area of the surface may be at least 10 times larger than the area defined by the contact point. The area of the surface may be even larger (or the contact point relatively smaller), such as at least 20 or 30 times larger than the area defined by the contact point. The area of the surface refers to the area of the surface from where melted metal flows to form the joint.

The area of the surface may be at least 3 times larger than a cross-sectional area of the joint. The area of the surface may be even bigger (or the cross-sectional area of the joint relatively smaller), such as it is at least 6 or 10 times larger than the area defined by the contact point. The cross-sectional area of the joint may be defined as the cross-sectional area that the joint has across a plane that is parallel to the surface where the contact point is located, at a location where the joint has its smallest extension (cross sectional area).

The joint may comprise at least 50 wt % or at least 85 wt % or even 100 wt % metal (metallic element) that, before the heating, was part of any of the first metal part and the second metal part. This is accomplished by allowing metal of the metal parts to flow to the contact point and form the joint. A joint that is formed in this way is very different from joints that are formed by brazing, since such joints generally comprises at least 90 wt % metal that, before the brazing, was part of a filler metal of the a brazing substance that was used to form the joint.

Any of the first metal part and the second metal part may comprise a plurality of protrusions that extend towards the other metal part, such that, when bringing the second metal part into contact with said surface, a plurality of contact points are formed on said surface. This is typically the case when the metal parts have the shape of corrugated plates that are stacked and joined to form heat exchangers.

The first metal part may comprise any of:
i) >50 wt % Fe, <13 wt % Cr, <1 wt % Mo, <1 wt % Ni and <3 wt % Mn;
ii) >90 wt % Fe;
iii) >65 wt % Fe and >13 wt % Cr;
iv) >50 wt % Fe, >15.5 wt % Cr and >6 wt % Ni;
v) >50 wt % Fe, >15.5 wt % Cr, 1-10 wt % Mo and >8 wt % Ni;
vi) >97 wt % Ni;
vii) >10 wt % Cr and >60 wt % Ni;
viii) >15 wt % Cr, >10 wt % Mo and >50 wt % Ni;
ix) >70 wt % Co; and
x) >10 wt % Fe, 0.1-30 wt % Mo, 0.1-30 wt % Ni and >50 wt % Co.

The above means that the first metal part, and the second metal part as well, may be made of a large number of different alloys. Obviously, the examples above are balanced with other metals or elements, as common within the industry.

According to another aspect a product comprising a first metal part that is joined with a second metal part by a joint is provided. The metal parts have a solidus temperature above 1100° C. and the joint comprises at least 50 wt % metallic elements that have been drawn from an area that surrounds the joint and which area was part of any of the first metal part and the second metal part.

According to another aspect a product is provided which comprises a first metal part that is joined with a second metal part according to the method above or any of its embodiments.

According to another aspect a melting depressant composition is provided for, i.e. specifically developed and configured to, joining a first metal part with a second metal part according to the method above or any of its embodiments, the melting depressant composition comprising i) a melting depressant component that comprises at least 25 wt % boron and silicon for decreasing a melting temperature, and ii), optionally, a binder component for facilitating applying of the melting depressant composition on the first metal part.

Different objectives, features, aspects and advantages of the method, the products and the melting depressant composition will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
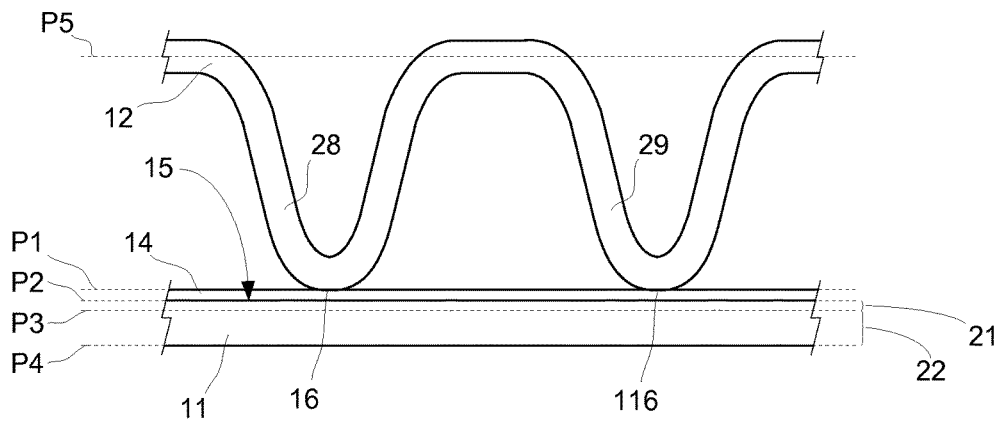
FIG. 1 is a cross-sectional view of a first and a second metal part where a melting depressant composition is applied intermediate the parts.

FIG. 1 shows a first metal part 11 and a second metal part 12 where a melting depressant composition 14 is arranged on a surface 15 of the first metal part 11. The second metal part 12 is, at a contact point 16, in contact with the melting depressant composition 14 on the surface 15. For the illustrated second metal part 12, a first protrusion 28 is in contact with the melting depressant composition 14 at contact point 16 while a second protrusion 29 is in contact with the melting depressant composition 14 at another contact point 116. The first metal part 11 is made of a metallic element, such as an iron-based alloy. More examples of suitable metallic elements the first metal part 11 may be made of are given below. The second metal part 12 is also made of a metallic element, which may be the same metallic element that as the first metal part 11 is made of. In FIG. 1 the first metal part 11 and the second metal part 12 are not yet joined.

Five planes P1-P5 are used for describing how the first metal part 11 and the second metal part 12 are joined. The first plane P1 defines the surface of the melting depressant composition 14. The second plane P2 defines the surface 15 of the first metal part 11, which is an "upper" surface 15 of the first metal part 11. This means that the melting depressant composition 14 has a thickness that corresponds to the distance between the first plane P1 and the second plane P2 (the surface 15). It should be noted that the thickness of the melting depressant composition 14 is greatly exaggerated in the illustrated figures. The real thickness, i.e. the amount of the melting depressant composition 14 on the surface 15 as well as the composition of the melting depressant composition 14, is discussed in detail below.

The third plane P3 defines a surface layer 21 of the first metal part 11, where the surface layer 21 extends from the surface 15 and to the third plane P3 which is located in the first metal part 11. Thus, the thickness of the surface layer 21 corresponds to the distance between the second plane P2 (the surface 15) and the third plane P3. The fourth plane P4 defines a lower surface of the first metal part 11. The thickness of the first metal part 11 corresponds to the distance between the second plane P2 and fourth plane P4. The first metal part 11 has also a lower layer 22, which is the part of the first metal part 11 that does not include the surface layer 21 and which extends from the third plane P3 to the fourth plane P4. The fifth plane P5 defines a base line of the second metal part 12, where the first protrusion 28 and second protrusion 29 protrudes from the base line in a direction towards the first metal part 11.

The illustrated shapes of the first metal part 11 and the second metal part 12 are just exemplifying shapes and other shapes are equally conceivable. For example, the metal parts 11, 12 may have curved shapes, such that the planes P1-P5 do not have the form of flat, two-dimensional surfaces, but instead the form of curved surfaces.

Figure 2:
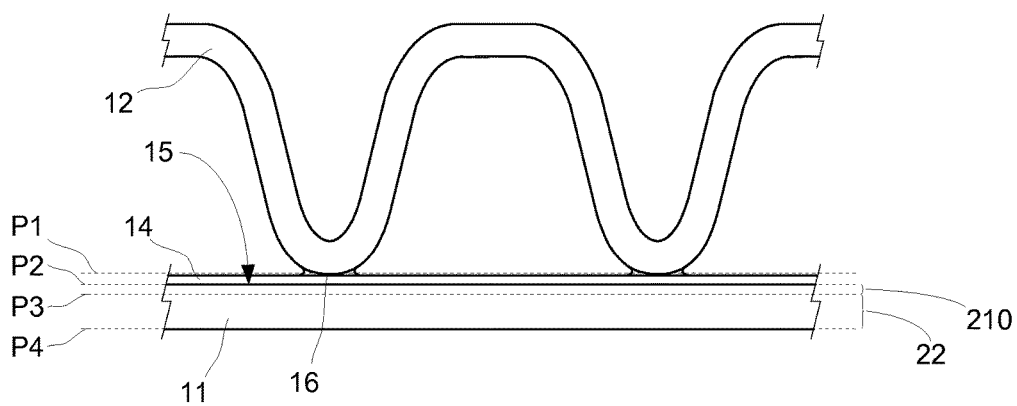
FIG. 2 shows the metal parts of FIG. 1 during heating.

FIG. 2 shows the metal components 11, 12 when they are heated to a temperature above which the melting depressant composition 14 causes the surface layer 21 to melt and form a melted metal layer 210, but at a temperature that is below a melting temperature of the material in the first metal part 11 and in the second metal part 12. In brief, when heating the metal parts 11, 12, boron and silicon in the melting depressant composition 14 diffuses into the first metal part 11 and causes it to melt at a temperature that is lower than the melting temperature of the material in the first metal part 11 (and of the second metal part 12). The melting depressant composition 14 is applied on the surface 15 at amounts that causes the surface layer 21 to melt and form the melted metal layer 210. Thus, the amount of melting depressant composition 14 is chosen so that boron and silicon diffuses only into the surface layer 21 (too much boron and silicon may melt the entire first metal part 11). Suitable amounts of the melting depressant composition 14 are described in the examples below. Metal in the melted metal layer 210 then flows, typically by capillary action, towards the contact point 16 (and to other, similar contact points such as contact point 116).

Figure 3:
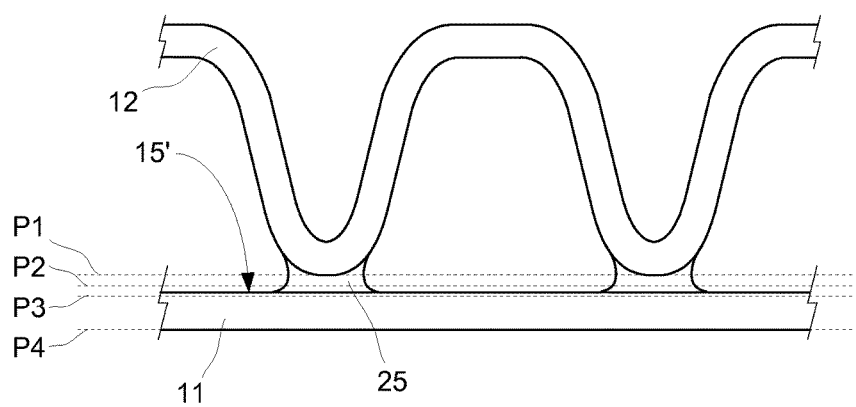
FIG. 3 shows the metal parts of FIG. 1 when a joint is formed.

FIG. 3 shows the metal components 11, 12 when all melting depressant composition 14 have diffused into the first metal part 11 and when metal in the melted metal layer 210 has flown towards the contact point 16 where a joint 25 now is formed. The joint now comprises metal that previously was part of the first metal part 11. As may be seen, the melting depressant composition 14 is no longer present on the surface 15 of the first metal part 11 since it has diffused into the first metal part 11 and, typically, to some extent into the second metal part 12. Since the joint 25 is formed from metal from the first metal part 11 the first metal part 11 is now thinner than before the heating. As may be seen, the first metal part 11 now has an upper surface 15' that is not located at the second plane P2. Instead, the upper surface is now closer to the fourth plane P4. Generally, not all metal in the melted metal layer 210 flows towards the contact point 16 to form the joint 25, but some remains as an upper surface of the first metal part 11 and solidifies there simultaneously with the solidification of the joint 25. The solidification takes place when the temperature is decreased but also prior a decrease of the temperature, e.g. because the boron and silicon in the melting depressant composition gradually diffuse into and mix with the material of the first metal part 11. The physical process behind the melting of the metal in the first metal part 11 as well as the subsequent solidification is similar with the melting and solidification process that occur during brazing. However, compared to conventional brazing there is a great difference in that the melting depressant composition 14 comprises no or very small amounts of filler metal; instead of using a filler metal for creating the joint 25, metal from the first metal part 11 and, optionally as will be described, from the second metal part 12, is used for creating the joint 25.

Figure 4:
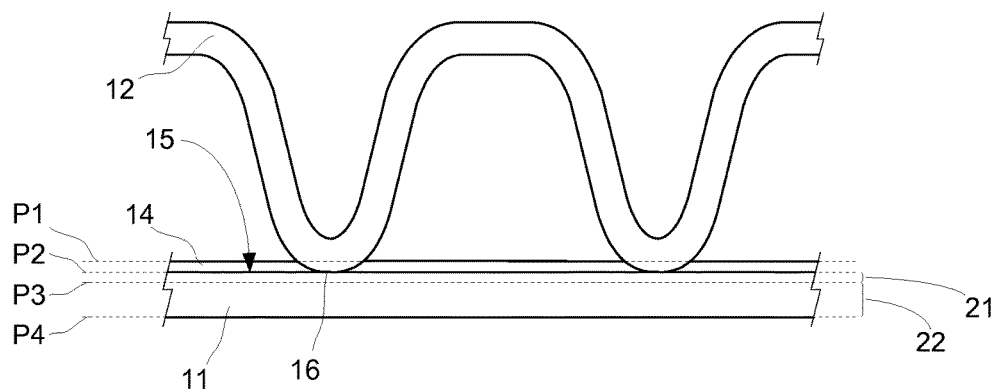
FIG. 4 is a cross-sectional view of a first and a second metal part where a melting depressant composition is applied intermediate the components and when the second metal part abuts the first metal part.
Figure 5:
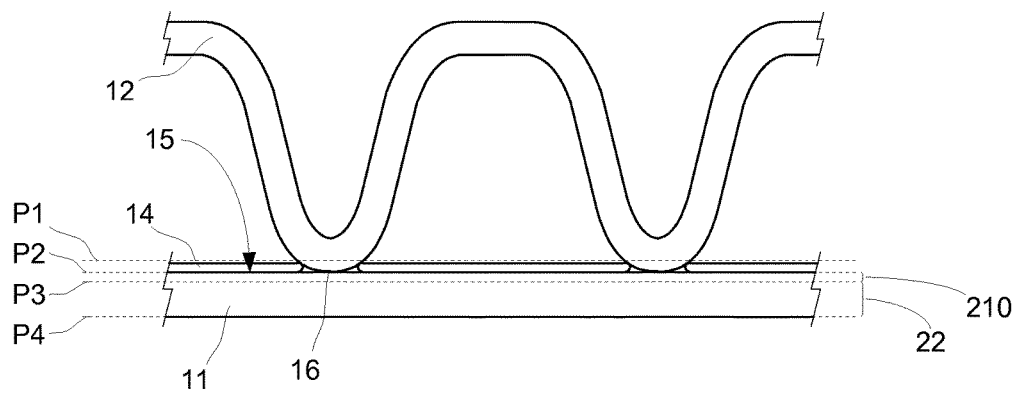
FIG. 5 shows the metal parts of FIG. 4 during heating.
Figure 6:
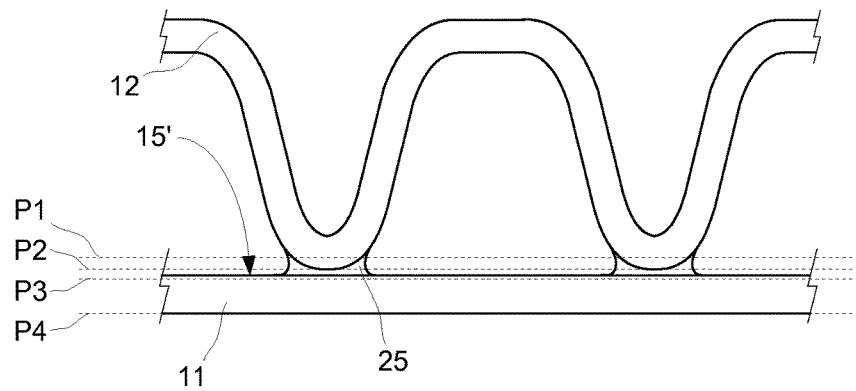
FIG. 6 shows the metal parts of FIG. 4 when a joint is formed.

FIGS. 4-6 corresponds to FIGS. 1-3 with the difference that the second metal part 12 is pressed into the melting depressant composition 14 to such an extent that it is basically in contact with or abuts to the first metal part 11 (some small amounts of the melting depressant composition 14 is still typically present between the metal parts 11, 12).

Figure 7:
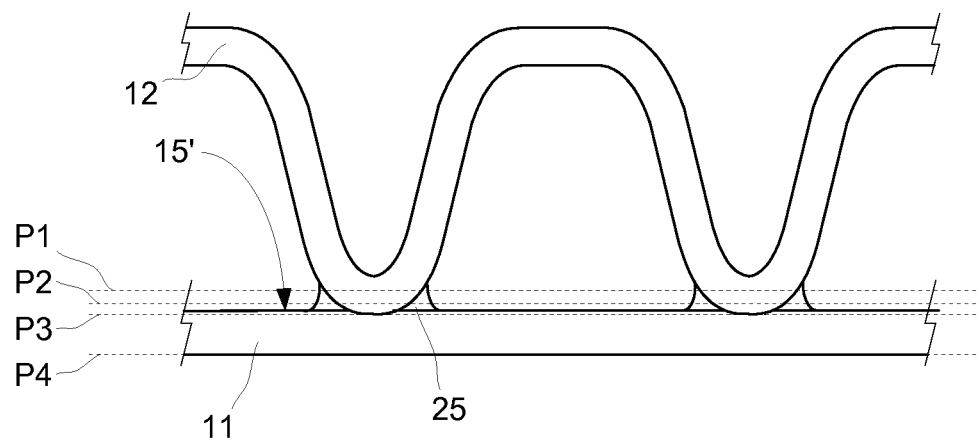
FIG. 7 shows metal parts when a joint is formed and where the parts have been pressed towards each other during the forming of the joint.

FIG. 7 corresponds to FIGS. 3 and 6 with the difference that the first metal part 11 and the second metal part 12 has been pressed towards each other during the forming the joint 25. As a result the second metal part 12 has at the location of the joint 25 "sunk" into the melted metal layer 210 of the first metal part 11.

Figure 8:
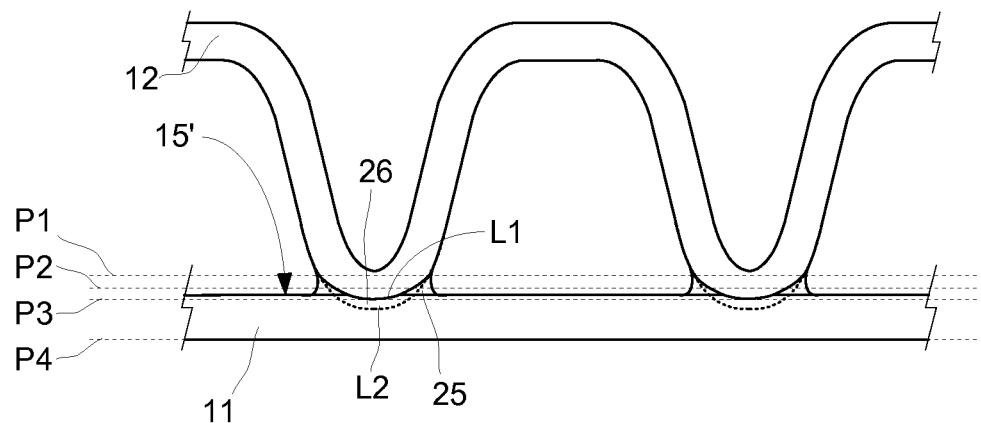
FIG. 8 is a view corresponding to FIG. 7, where material from both metal parts have melted and formed the joint, FIG. 9, corresponds to FIG. 1 and shows distribution of a contact point between the metal parts.

FIG. 8 corresponds to FIG. 7, where material from both the first metal part 11 and the second metal part 12 have melted and formed the joint 25. In practice, this is typically what happens during the forming the joint 25, especially if the first metal part 11 and the second metal part 12 are made of the same material, since the second metal part 12 also is in contact with the melting depressant composition.

Before the heating the second metal part 12 has an outer contour defined by line L2. During heating a surface layer of the second metal part 12 forms a melted surface layer, where the metal of this layer flows to the contact point 16 and forms part of a joint 25 there. The melted surface layer of the second metal part 12 is represented by the layer between line L2 and line L1, where line L1 defines a boundary where the metal of the second metal part 12 has not been melted.

It should be noted that there is no real sharp boundaries between metal of the first metal part 11 and the second metal part 12 that is melted respectively is not melted. Instead, there is a gradual transition from "melted" to "not melted".

Figure 9:
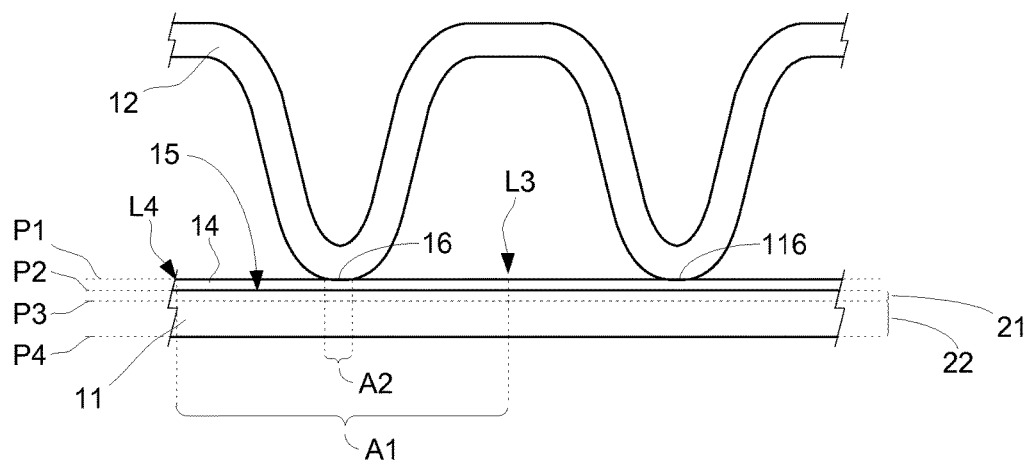
Figure 10:
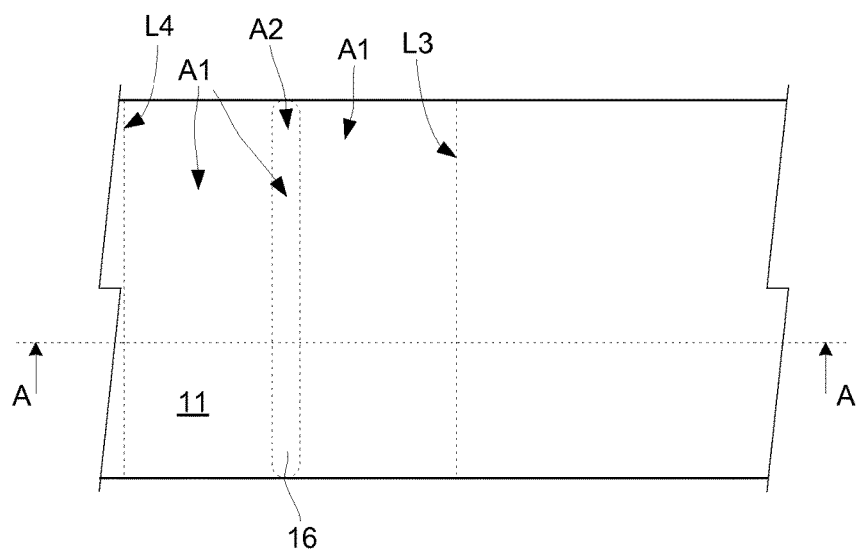
FIG. 10 shows an area of the contact point between the metal parts, FIG. 11, corresponds to FIG. 3 and shows distribution of a joint between the metal parts.

FIG. 9 corresponds to FIG. 1 and shows a distribution of the contact point 16 between the first metal part 11 and the second metal part 12. FIG. 10 shows the same metal parts 11, 12 but from above and in the first plane P1. FIG. 9 is a cross-sectional view as seen along line A-A in FIG. 10.

As may be seen, the contact point 16 has a distribution over the melting depressant composition 14 on the first metal part 11 that is significantly larger than a distribution of the melting depressant composition 14 on the surface 15. The distribution of the contact point 16 has an area A2 that is significantly smaller than an area A1 of the melting depressant composition 14 on the surface 15. The area A1 comprises the area the A2. The area A1 extends between two lines L3, L4 that are located at a respective side of the contact point 16. Line L3 is located between the contact point 16 and the other contact point 116, since melted metal of the first metal part 11 generally flows towards the closest contact point. The area A1 of the surface 15 on which the melting depressant composition 14 is applied is at least 10 times larger than the area A2 defined by the contact point 16. The area A1 may be defined as an area of the surface 15 on which melting depressant composition 14 is applied and from which area A1 metal is drawn to the form the joint 25. The area A2 may be defined as the area of the contact point 16, i.e. the area of contact between the melting depressant composition 14 and the second metal part 12, optionally including an area of contact (if any) between the first metal part 11 and the second metal part 12 at the contact point 16. The area A1 is generally at least 10 times larger than the area A2.

Figure 11:
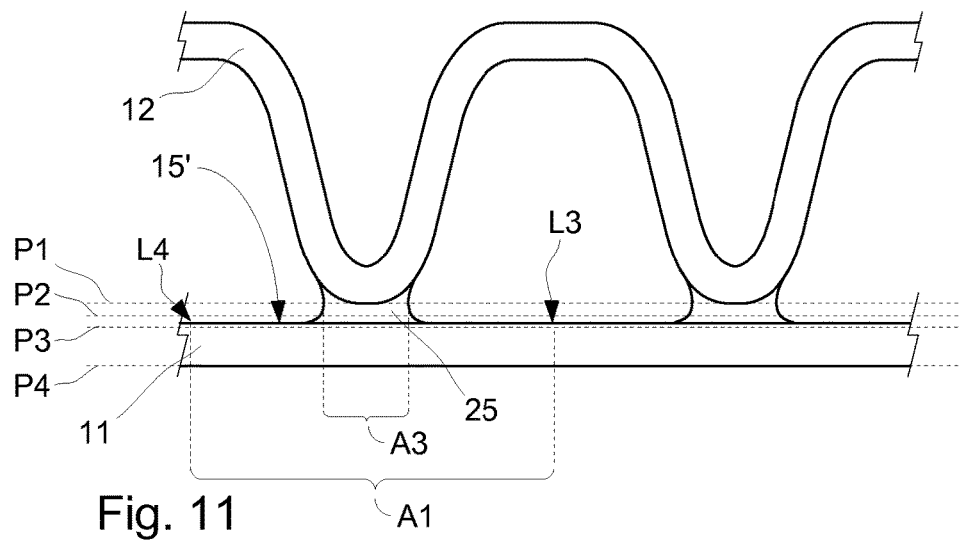
Figure 12:
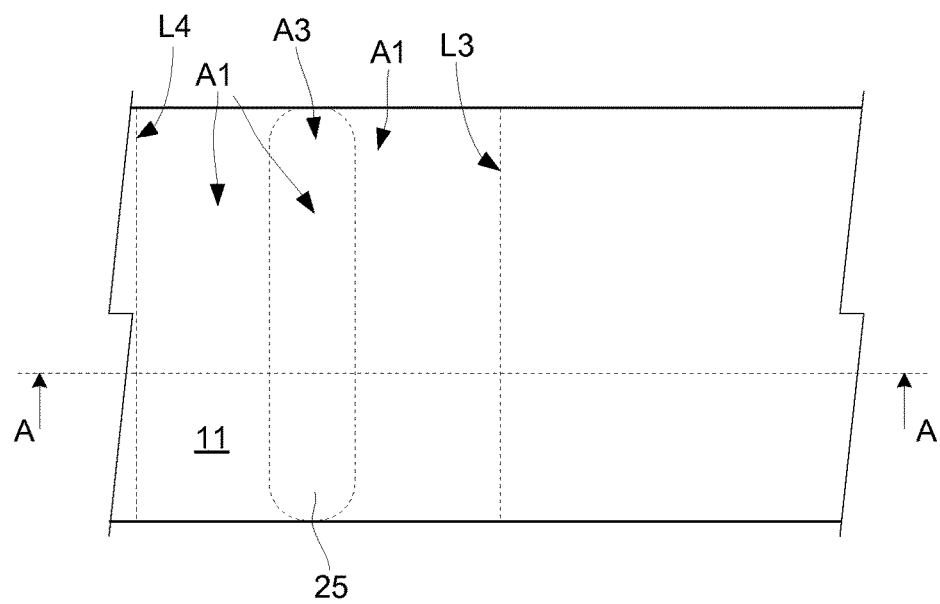
FIG. 12 shows a cross-sectional area of the joint.

FIG. 11 corresponds to FIG. 3 and shows a cross-sectional area A3 of the joint 25. The area A1 of the surface 15 on which the melting depressant composition 14 is applied is at least 3 times larger than the cross-sectional area A3 of the joint 25. FIG. 12 shows the same metal parts 11, 12 but from above and in the second plane P2. FIG. 11 is a cross-sectional view as seen along line A-A in FIG. 12.

As may be seen, the joint 25 has a cross-sectional are A3 that is significantly smaller than the area A1 of the melting depressant composition 14 on the surface 15. As before, the area A1 may be defined as an area of the surface 15 on which melting depressant composition 14 is applied and from which area A1 metal is drawn to form the joint 25. The cross-sectional area A3 of the joint 25 may be defined as the smallest area the joint 25 has between the first metal part 11 and the second metal part 12. The cross-sectional area A3 may have the shape of a curved surface. Obviously, the areas A1 and A2 may have the shape of curved surfaces, depending on the respective shape of the first metal part 11 and the second metal part 12.

A number of experiments and examples are now presented for describing suitable materials for the first metal part 11, the second metal part 12, the composition of the melting depressant composition 14, which amounts of melting depressant composition 14 should be used, suitable temperatures for the heating, for how long heating shall be done etc. Thus, the results of these experiments and examples are used for previously described entities like the first metal part 11, the second metal part 12, the melting depressant composition 14, the contact point 16, the joint 25 etc., i.e. all previously described entities may incorporate the respectively related features described in connection with the experiments and examples below. In the following the melting depressant composition is referred to as a "blend". Metal part may be referred to as "parent metal".

Figure 13:
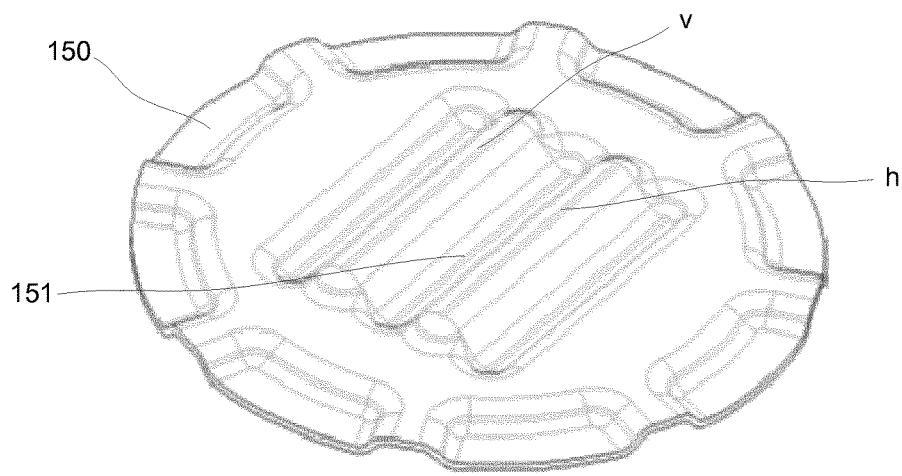
FIG. 13 shows a pressed plate that is used in a number of examples that described how two metal parts may be joined.

FIG. 13 shows a plate 150 that is used for exemplifying how two metal parts may be joined. The plate 150 is a circular, pressed plate, which is 42 mm in diameter, has a thickness of 0.4 mm and is made of stainless steel type 316L (SAE steel grade). The pressed plate 150 has two pressed beams v and h, each approximately 20 mm long. Beam v stands for left beam and beam h stands for right beam. The "v" and "h" are used in examples 5 and 9 below.

Figure 14:
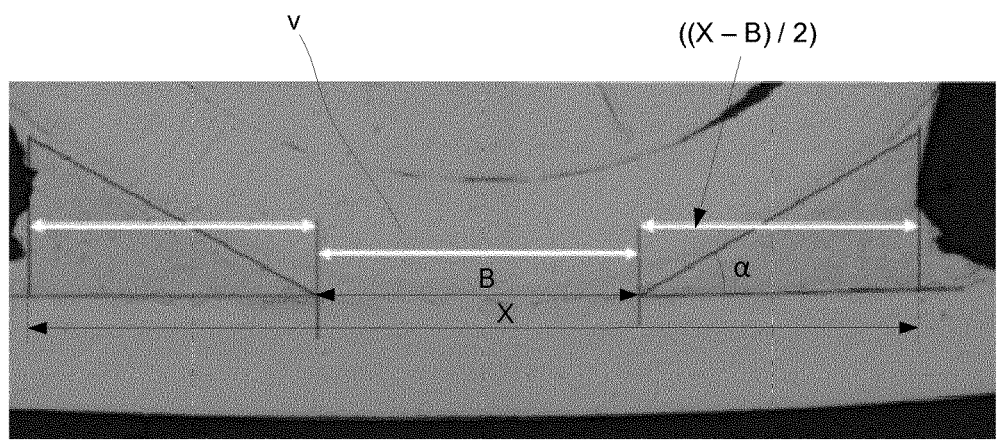
FIG. 14 is a photo of a cross-section of a joint between the plate shown in FIG. 13 and a flat plate.

FIG. 14 shows a cross-section of a joint between a plate 150 of the type shown in FIG. 13 and a flat plate. At the contact point between the beams of the plate 150 and the flat plate a joint is created. To estimate the amount of metal that forms the joint the following approximations and calculations have been made.

It has been estimated that the volume in the center of the joint is negligible. Therefore, the created metal volume for joints over a width like width B (in the example 1.21 mm or less), is set to zero. On the outer sides of the beam v, which has a distance of (X−B)/2, metal has been accumulated. When blend (melting depressant composition) is applied on the flat plate, the plates are held together and heated surface layers of the plates melt and metal in melted form is transported by capillary action to the area of the joint from neighboring areas, thus forming volumes of metal that constitutes the joint.

It is possible to calculate an area by estimating that two triangles are formed on each side of the center of the joint. The angle $\alpha$ in the triangle is measured to 28°. The total measured width is X and the center width is B. The total area A of the two triangles are therefore $A=2\cdot(((X-B)/2)\cdot((X-B)/2)\cdot\tan(\alpha))/2$. When measuring B to 1.21 mm, then $A=2\cdot(((X-1.21)/2)\cdot((X-1.21)/2)\cdot\tan(28))/2$. The total created volume of braze alloy, which has flown to the crevices to form the joint, would be the area times the length of the two beams v, h. Some of the formed braze alloy does not flow to the crevices and is left on the surface where the blend was applied.

Figure 15:
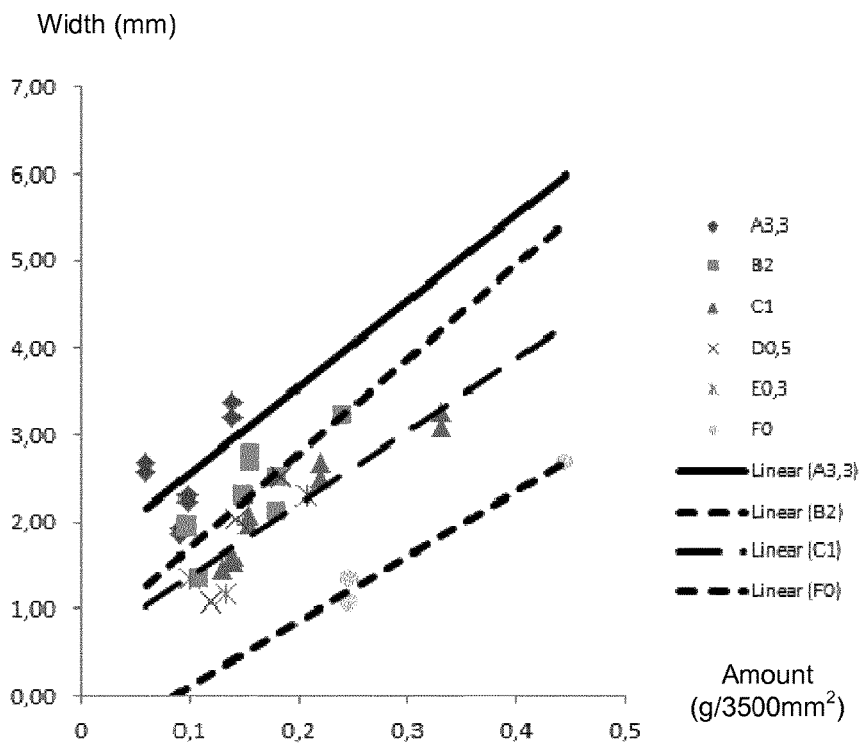
FIG. 15 shows a diagram where a measured joint width is plotted as a function of an applied amount (g/3500 mm$^2$) of melting depressant composition, including trend lines.

FIG. 15 is a diagram showing the measured width as a function of applied amount of different embodiments of the blend (g/3500 mm$^2$, i.e. gram per 3500 square mm) with trend lines. The results of the tests are shown in table 8 and 9 (see Example 5 below) and in FIG. 15. The trend lines of FIG. 3 are bases on function $Y=K\cdot X+L$, where Y is the area, K is the inclination of the line, X is the applied amount of blend and L is a constant. The results of the measured widths and the estimated areas are illustrated by FIG. 15. The applied amounts of blend, see tables 8 and 9, were from 0.06 g/3500 mm$^2$ to 0.96 gram/3500 mm$^2$, which correspond to from approximately 0.017 mg/mm$^2$ to 0.274 mg/mm$^2$.

The trend line $Y=K\cdot X+L$ for the blend was measured, where Y is the joint width, K is the inclination of the line, X is the applied amount of blend and L is a constant, see Fig surface 15 3. Thus, the width of braze joint is:

$Y$ (width for $A3.3$)=1.554+9.922·(applied amount of blend $A3.3$)

$Y$ (width for $B2$)=0.626+10.807·(applied amount of blend $B2$)

$Y$ (width for $C1$)=0.537+8.342·(applied amount of blend $C1$)

$Y$ (width for $F0$)=0.632+7.456·(applied amount of blend $F0$)

As observed from FIG. 15 blends A3.3 out of blends A3.3, B2, C1, D0.5, E0.3 and F0 give the highest amount of braze alloy in the joint as a function of applied amount of blend. Sample F0 did not give any substantial joints below 0.20 gram per 3500 mm².

Figure 16:
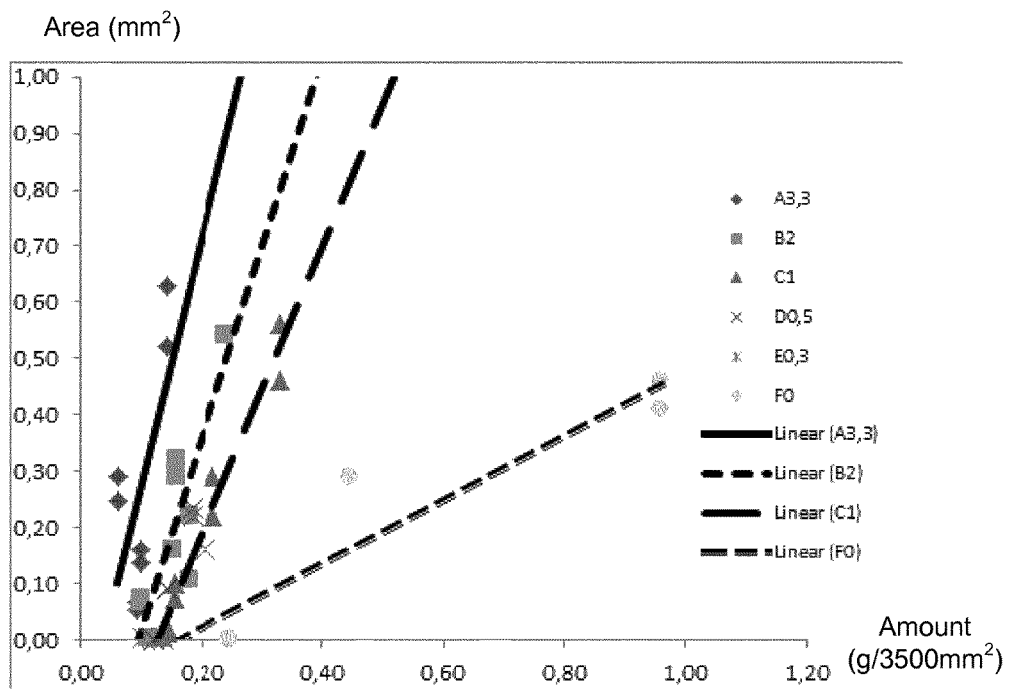
FIG. 16 shows another diagram where a calculated filled area of the joint based on the measured width is plotted as a function of applied amount (g/3500 mm$^2$) of melting depressant composition, including trend lines.

FIG. 16 shows another diagram in which calculated filled area of the braze joint based on the measured width as a function of applied blend amount (gram/3500 mm²) with trend lines is plotted. The trend line Y=K·X−L for the blend were measured, where Y is the area, K is the inclination of the line, X is the applied amount of blend and L is a constant, see FIG. 16. For FIG. 16 the area of braze joint is:

Y (area for $A3.3$)=4.361·(applied amount of blend $A3.3$)−0.161

Y (area for $B2$)=3.372·(applied amount of blend $B2$)−0.318

Y (area for $C1$)=2.549·(applied amount of blend $C1$)−0.321

Y (area for $F0$)=0.569·(applied amount of blend $F0$)−0.093

An estimation of the created volume based on the diagram in FIG. 16 for e.g. an amount of 0.18 gram per 3500 mm², excluding sample F0, due to "no" braze joints and sample D0.5 due to too little data, gives a value for the samples for created volume of braze alloy in the joint between the plates, see the following:

Volume ($A3.3$)=0.63·length 40 (20·2)=25.2 mm³

Volume ($B2$)=0.30·length 40 (20·2)=12.0 mm³

Volume ($C1$)=0.12·length 40 (20·2)=4.8 mm³

Volume ($E0.3$)=0.10·length 40 (20·2)=4.0 mm³

Figure 17:
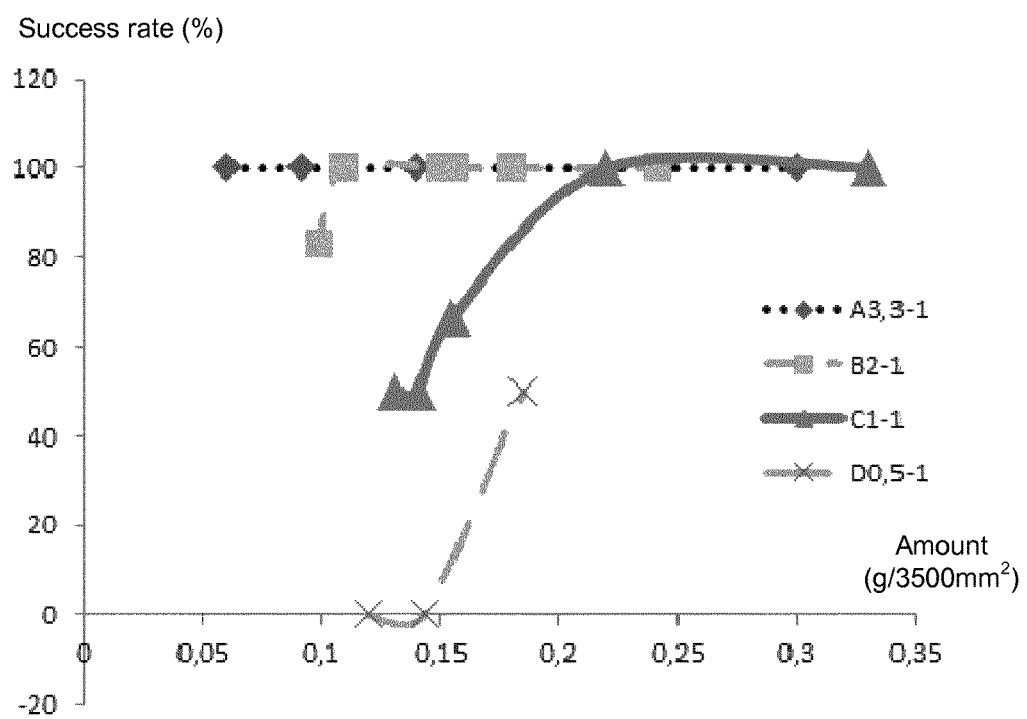
FIG. 17 shows another diagram where the % of tensile tested samples where the joint was stronger or the same as the plate material is plotted as a function of applied amount (g/3500 mm$^2$) of melting depressant composition, including trend lines.

FIG. 17 shows another diagram in which the % (percent) is the success rate of tensile experiments where the joint was stronger or the same as the plate material as a function of applied amount of blend, i.e. gram per 3500 mm². When the plate was stronger than the joint, resulting in a split of the joint, the result was set to zero. For the samples that the joint were stronger than the plate material the difference in results was not statistical significant.

Figure 18:
FIG. 18 shows picture other test samples that has been joining.

FIG. 18 shows a further sample of joining by forming joints by means of a blend. The picture shows that there is a joint formed between the two plates. The sample is from Example 10.

EXAMPLES

In the following examples more details are presented for illustrating the invention.

The tests in these examples were made to investigate if silicon, Si, was able to create a "braze alloy" when the silicon was applied on the surface of a test sample of parent metal (i.e. on a metal part). Also, different amounts of boron, B, were added for decreasing the melting point for the braze alloy. Boron is also used for changing the wetting behavior of the braze alloy. Properties of the tested blends were also investigated. In the examples wt % is percent by weight and atm % is percent of atoms. Here, "braze alloy" is referred to as the alloy formed when the silicon and boron causes a part of, or layer of, the parent metal (metal part), to melt. The "braze alloy" thus comprises the blend and metallic elements from the parent metal.

If nothing else is stated the test samples of parent metal for all tests were cleaned by dish washing and with acetone before samples of the blends of silicon and boron were added to the test samples.

Example 1

Example 1 concerns preparation of samples of blends of silicon and boron to be tested. Blend sample No. C1 was prepared by blending 118.0 gram of crystalline silicon powder particle size 325 mesh, 99.5% (metal basis) 7440-21-3 from Alfa Aesar—Johnsson Matthey Company, with 13.06 gram of crystalline boron powder particle size 325 mesh, 98% (metal basis) 7440-42-8 from Alfa Aesar—Johnsson Matthey Company and 77.0 gram of Nicorobraz S-30 binder from Wall Colmonoy in a Varimixer BEAR from Busch & Holm producing 208 gram of paste, see sample C1. All test samples were prepared following the same procedure as blend sample C1. The samples are summarized in Table 2. The prepared blend corresponds to the "melting depressant composition" previously discussed. The boron and the silicon in the blend corresponds to the "melting depressant component" of the melting depressant composition and the binder in the blend corresponds to the "binder component" of the melting depressant composition.

TABLE 2

| Blend sample No. | Boron [gram] | Silicon [gram] | S-30 Binder [gram] | Total Weight [gram] |
|---|---|---|---|---|
| F0 | 0.00 | 124.7 | 73.3 | 198 |
| E0.3 | 4.30 | 123.9 | 72.1 | 200 |
| D0.5 | 6.41 | 121.2 | 75.0 | 203 |
| C1 | 13.06 | 118.0 | 77.0 | 208 |
| B2 | 24.88 | 104.5 | 72.81 | 202 |
| A3.3 | 11.46 | 22.9 | 19.3 | 54.0 |

Samples G15, H100, I66 and J was prepared the same way as samples F0, E0.3, D0.5, C1, B2 and A3.3 with the difference that another binder was used. The binder was Nicorobraz S-20 binder from Wall Colmonoy. These test samples are summarized in Table 3.

TABLE 3

| Blend sample No. | Boron [gram] | Silicon [gram] | S-20 Binder [gram] | Total Weight [gram] |
|---|---|---|---|---|
| G15 | 0.37 | 2.24 | 3.1 | 5.7 |
| H100 | 4.19 | 0 | 5.3 | 9.5 |
| I66 | 1.80 | 2.70 | 5.5 | 10.0 |
| J | 2.03 | 2.02 | 5.0 | 9.0 |

For the blend samples calculations have been made to show ratio, percent by weight and percent by atoms, as shown in Table 4.

TABLE 4

| Blend Sample | Ratio [wt:wt] | | Amount [wt %] | | Amount [atm %] | |
|---|---|---|---|---|---|---|
| No. | Boron | Silicon | Boron | Silicon | Boron | Silicon |
| F0 | 0 | 100 | 0 | 100 | 0 | 100 |
| E0.3 | 3 | 100 | 3 | 97 | 8 | 92 |
| D0.5 | 5 | 100 | 5 | 95 | 12 | 88 |
| C1 | 10 | 100 | 9 | 91 | 21 | 79 |

TABLE 4-continued

| Blend Sample No. | Ratio [wt:wt] | | Amount [wt %] | | Amount [atm %] | |
|---|---|---|---|---|---|---|
| | Boron | Silicon | Boron | Silicon | Boron | Silicon |
| B2 | 19 | 100 | 16 | 84 | 33 | 67 |
| A3.3 | 33 | 100 | 25 | 75 | 46 | 54 |
| G15 | 17 | 100 | 14 | 86 | 30 | 70 |
| H100 | 100 | 0 | 100 | 0 | 100 | 0 |
| I66 | 66 | 100 | 40 | 60 | 63 | 37 |
| J | 100 | 100 | 50 | 50 | 72 | 28 |

Binder

The binder (polymeric and solvent) content in the S-20 and S-30 binder was measured. Then the content of "dry" material within the gels was tested. Samples of S-20 binder and S-30 binder were weighted and thereafter placed in an oven for 18 hours at 98° C. After the samples had been taken out of the oven they were weighted again and the results are presented in Table 5.

TABLE 5

| Binder | Before [gram] | After [gram] | Polymeric proportion [wt %] |
|---|---|---|---|
| S-20 | 199.64 | 2.88 | 1.44 |
| S-30 | 108.38 | 2.68 | 2.47 |

Example 2

Example 2 concerns brazing tests, i.e. tests where the blend samples were arranged on metal parts (test parts or test plates). The metal parts had the form of circular test pieces having a diameter of 83 mm and a thickness of 0.8 mm and the metal parts were made of stainless steel type 316L. Two different amounts of blend was used: 0.2 g and 0.4 g. The blend was applied on the metal part. All samples were brazed in a conventional vacuum furnace at 1210° C. for 1 hour. Double tests were performed. Meaning, two amounts of blend, double samples and six different blends, 2·2·6=24 samples. The tested blends are: F0, E0.3, D0.5, C1, B2 and A3.3. The blends were applied on a circular area of the metal part, having a diameter of approximately 10 to 14 mm, i.e. a surface of 78 to 154 mm². This approximately 1.3-5.1 mg of blend was applied per mm².

It was observed that the metal of the metal parts had melted, i.e. melts were created. It was also observed that the melts in some aspects appeared as a braze alloy with flow. Without measuring the size of the wetting it appeared that an increased amount of boron in the blends resulted in better wetting. However it was also seen that for several samples the whole thickness of the metal part had melted such that a hole was created in the middle of the metal part. For the "0.2 gram samples" five out of twelve test pieces had holes, and for the "0.4 gram pieces" ten out of twelve had holes. Further tests have shown that, for avoiding holes, it may suitable to apply an average of 0.02-0.12 mg boron and silicon per mm² when the metal part has a thickness of 0.3-0.6 mm. When the metal part has a thickness of 0.6-1.0 mm 0.02-1.0 mg boron and silicon per mm² may be suitable. Even more suitable amounts may be empirically determined.

Example 3

Example 3 concerns the applying of the blend on a surface. In this Example the test plates (metal parts) were prepared for fillet tests, corrosion tests and tensile tests at the same time. From Example 2 it was concluded that it could be a risk to apply the blends of silicon and boron in dots or lines on thin-walled plates, as this may create holes in the plates. Therefore, new test samples, i.e. test plates, were used for application of the different the blends of Si and B for the fillet tests, corrosion tests, and the tensile tests.

The new test samples were plates made of stainless steel type 316L. The size of the plates were 100 mm wide, 180 to 200 mm long and the thickness were 0.4 mm. All plates were cleaned by dish washing and with acetone before application of samples of the blends of Si and B. The weight was measured. On each plate a part measured as 35 mm from the short side was masked.

The different test blends A3.3, B2, C1, D0.5, E0.3, F0, G15, H100, and I66 were used. The test plates were painted (by using a conventional brush) with the blends on an unmasked surface area of the plate, which surface area had the size of 100 mm×35 mm. The binder was S-30. After drying for more than 12 hours in room temperature the masking tape was removed and the plate weight was measured for each plate. The weight presented in Table 6 below is the weight of the total amount of the blends on the area of 100 mm×35 mm=3500 mm²=35 cm². The example shows that blend is easily applied on metal surfaces.

TABLE 6

| Blend sample No. | Ratio B:Si [wt:wt] | Weight of blend + dried binder [gram] | Weight of blend Si + B without binder [gram] | Weight of blend per area [mg/cm²] |
|---|---|---|---|---|
| A3.3 | 33:100 | 0.0983 | 0.0959 | 2.74 |
| B2 | 19:100 | 0.0989 | 0.0965 | 2.76 |
| C1 | 10:100 | 0.1309 | 0.1277 | 3.65 |
| D0.5 | 5:100 | 0.1196 | 0.1166 | 3.33 |
| E0.3 | 3:100 | 0.0995 | 0.0970 | 2.77 |
| H100 | 100:0 | 0.1100 | 0.1073 | 3.07 |
| I66 | 66:100 | 0.0900 | 0.0878 | 2.51 |

Example 4

Example 4 concerns corrosion-bend tests. From test plates slices were cut out having width of 35 mm, meaning having an applied surface area of 35 mm×35 mm. Onto this surface area a circular pressed plate was placed (see FIG. 13) which pressed plate had a size of 42 mm in diameter and 0.4 mm thick made of stainless steel type 316L. The test samples were heated ("brazed") 1 hour at 1210° C. The tested plates for the corrosion tests had applied blend samples A3.3, B2, C1, D0.5, E0.3, H100, I66 and J, see Table 4.

The samples were tested according to corrosion test method ASTM A262, "Standard Practices for Detecting Susceptibility to inter-granular Attack in Austenitic Stainless Steels". "Practice E-Copper-Copper Sulfate-Sulfuric Acid. Test for Detecting Susceptibility to Inter-granular Attack in Austenitic Stainless Steels", was selected from the test method. The reason for selecting this corrosion tests was that there is a risk that boron might react with chromium in the steel to create chromium borides, mainly in the grain boundaries, and then increase the risk for inter-granular corrosion attack, what in the standard is referred to as "practice" was used, boiling 16% sulfuric acid together with copper sulfate in 20 hours and thereafter a bend test, according to chapter 30 in the standard.

The following discusses results from the corrosion-bend test and sectioning of the test samples. The test pieces were bent tested according to the corrosion test method in chapter 30.1 of the standard. None of the samples gave indications of inter granular attack at the ocular investigation of the bended surfaces. After the ASTM investigation the bended test samples were cut, ground and policed and the cross section was studied in light optical microscope in EDS, i.e. Energy Dispersive Spectroscopy. The results are summarized in Table 7.

TABLE 7

| Blend sample No. | Ocular investigation of surface for corrosion cracks when bended according to the ASTM test | Results of metallurgical investigation of the cross sectioned corrosion tested samples and bent tested test samples. SEM-EDS result of cracked phase |
|---|---|---|
| A3.3 | No cracks | No corrosion A surface layer of app. max 8 μm with a few cracks. The phase that had cracked had a high Cr and B content, most probably a chromium boride phase. |
| B2 | No cracks | No corrosion A surface layer of app. max 8 μm with a few cracks. The phase that had cracked had a high Cr and B content, most probably a chromium boride phase |
| C1 | No cracks | No corrosion or cracks |
| D0.5 | No cracks | No corrosion or cracks |
| E0.3 | No cracks | No corrosion A surface layer of app. max 60 μm with a few cracks. The phase that had cracked had a high Si content generally <5 wt % |
| H100 | No cracks | Corroded surface and joint |
| I66 | No cracks | No corrosion A surface layer of app. max 12 μm with a few cracks. The phase that had cracked had a high Cr and B content, most probably a chromium boride phase |
| J | No cracks | No corrosion A surface layer of app. max 20 μm with a few cracks. The phase that had cracked had a high Cr and B content, most probably a chromium boride phase |

Apparently, when adding high amounts of boron, as for sample H100, J, I66, a fragile phase was formed on the surface, most probably a chromium boride phase, increasing with the amount of boron. A fragile phase was not seen in the H100 sample, most probably due to the corrosion on the surface. Also the amount of borides increased with the amount of boron, meaning it has to be taken into consideration that the corrosion properties might decrease when adding high amounts of boron, as for sample H100 that was attacked in the corrosion test. This "negative" effect with boron can be decreased by using thicker parent metals and/or longer diffusion times (time used for allowing the joint to form). It is then possible to dilute boron in the parent metal. Also for the normal amount of boron as for A3.3 and B2 a thinner fragile surface layer was formed. It was seen that for the low amount of boron in the samples, sample E0.3, a quite thick fragile surface layer, with a high silicon content generally >5 wt % of silicon, was formed with a different characteristic than for the fragile surfaces for A3.3, B2, H100, I66 and J. The "negative" effect with silicon can be decreased by using thicker parent metals and/or longer diffusion times. It is then possible to dilute silicon in the parent metal.

Example 5

Example 5 concerns fillet tests of some samples. From test samples made according to Example 3, slices of the plates was cut out with the width of 35 mm, meaning an applied surface of 35 mm×35 mm. Onto this surface a circular pressed plate was placed, see FIG. 13, 42 mm in diameter and 0.4 mm thick, made of stainless steel type 316L. The pressed plate had two pressed beams, each approximately 20 mm long. The samples were brazed at approximately 1 hour at approximately 1200° C.

The results from the fillet test show that there were amounts of braze alloy in the joint area created between a flat surface area (on which the blend was applied), and a pressed beam of the test sample shown in FIG. 13. The amount of braze alloy was calculated by an approximation, see FIG. 14, by calculating an area by estimating that two triangles are formed on each side of the center of the joint. In the middle part there is no or very small amounts of additional formed "brazing alloy". The two triangles can be measured by measuring the height (h) and the base (b), the total area of the two triangles are summing up to (h)·(b) since there are two triangles. The problem with this calculation is that the height is hard to measure. Therefore we use the following equation for calculating of the two triangle areas:

$$A=((X-B)/2)\cdot((X-B)/2)\cdot\tan\alpha$$

A is total area of the two triangles, X is the total width of the formed joint, B is the part of the formed joint where the volume of the formed brazing alloy in the center of the joint is negligible. Thus, the base of each triangle is $(X-B)/2$. The height is calculated by measuring the angle $\alpha$, which is the angle between the tangents of the pressed beam to the base.

To calculate the volume of the formed braze alloy that had flown to the crevices a length of respective the two beams in contact with the surface measured was measured to 20 mm. The total length of the beams was multiplied with the total area.

The area of two triangles is the estimated area after brazing in Tables 8 and 9. The volume is the volume of the formed brazing alloy on one of the beams. The results from the fillet test are shown in table 8 and 9, and in FIG. 15. In Table 8 and in Table 9 v and h stand for v=left beam and h=right beam.

TABLE 8

(measured valued for the fillet test, samples A3.3-B2/B4)

| Blend sample No. | Applied binder Si + B [gram] | Width [mm] | Estimated Area after brazing [mm²] | Volume [mm³] |
|---|---|---|---|---|
| A3.3x-1v | 0.06 | 2.69 | 0.29 | 5.8 |
| A3.3x-1h | 0.06 | 2.58 | 0.25 | 5.0 |
| A3.3-1v | 0.10 | 2.23 | 0.14 | 2.8 |
| A3.3-1h | 0.10 | 2.31 | 0.16 | 3.2 |
| A3.3-2v | 0.14 | 3.38 | 0.63 | 12.6 |
| A3.3-2h | 0.14 | 3.19 | 0.52 | 10.4 |
| A3.3-3v | 0.09 | 1.92 | 0.07 | 1.4 |
| A3.3-3h | 0.09 | 1.85 | 0.05 | 1.0 |
| B2X-1v | 0.18 | 2.12 | 0.11 | 2.2 |
| B2X-1h | 0.18 | 2.50 | 0.22 | 4.4 |
| B2X-2v | 0.15 | 2.31 | 0.16 | 3.2 |
| B2X-2h | 0.15 | 2.31 | 0.16 | 3.2 |
| B2-1v | 0.10 | 1.96 | 0.07 | 1.4 |
| B2-1h | 0.10 | 1.92 | 0.07 | 1.4 |
| B2-2v | 0.24 | 3.23 | 0.54 | 10.8 |
| B2-2h | 0.24 | 3.23 | 0.54 | 10.8 |
| B2-3v | 0.16 | 2.77 | 0.32 | 6.4 |
| B2-3h | 0.16 | 2.69 | 0.29 | 5.8 |
| B4v | 0.11 | 1.35 | 0.00 | 0 |
| B4h | 0.11 | 1.35 | 0.00 | 0 |

TABLE 9

(measured valued for the fillet test for samples C1 to F0)

| Blend sample No. | Applied binder Si + B [gram] | Width [mm] | Estimated Area after brazing [mm²] | Volume [mm³] |
|---|---|---|---|---|
| C1X-1v | 0.22 | 2.50 | 0.22 | 4.4 |
| C1X-1h | 0.22 | 2.69 | 0.29 | 5.8 |
| C1X-2v | 0.33 | 3.08 | 0.46 | 9.2 |
| C1X-2h | 0.33 | 3.27 | 0.56 | 11.2 |
| C1-1v | 0.13 | 1.46 | 0.01 | 0.2 |
| C1-1h | 0.13 | 1.46 | 0.01 | 0.2 |
| C1-2v | 0.15 | 1.96 | 0.07 | 1.4 |
| C1-2h | 0.15 | 2.08 | 0.10 | 2.0 |
| C1-3v | 0.14 | 1.54 | 0.01 | 0.2 |
| C1-3h | 0.14 | 1.62 | 0.02 | 0.4 |
| D0.5-1v | 0.19 | 2.54 | 0.23 | 4.6 |
| D0.5-1h | 0.19 | 2.50 | 0.22 | 4.4 |
| D0.5-2v | 0.12 | 1.08 | 0.00 | 0 |
| D0.5-2h | 0.12 | 1.08 | 0.00 | 0 |
| D0.5-3v | 0.14 | 2.04 | 0.09 | 1.8 |
| D0.5-3h | 0.14 | 2.04 | 0.09 | 1.8 |
| E0.3-1v | 0.13 | 1.15 | 0.00 | 0 |
| E0.3-1h | 0.13 | 1.15 | 0.00 | 0 |
| E0.3-2v | 0.21 | 2.31 | 0.16 | 3.2 |
| E0.3-2h | 0.21 | 2.31 | 0.16 | 3.2 |
| E0.3-3v | 0.10 | 1.35 | 0.00 | 0 |
| E0.3-3h | 0.10 | 1.35 | 0.00 | 0 |
| F0-1h | 0.45 | 2.69 | 0.29 | 5.8 |
| F0-2v | 0.25 | 1.08 | 0.00 | 0 |
| F0-2h | 0.25 | 1.35 | 0.00 | 0 |
| F0-3v | 0.96 | 2.96 | 0.41 | 8.2 |
| F0-3h | 0.96 | 3.08 | 0.46 | 9.2 |

The results of the measured widths and the estimated areas are presented in Tables 8 and 9, and illustrated in the diagram of FIG. 15. The applied amounts, see Tables 8 and 9, were from 0.06 gram/3500 mm² to 0.96 gram/3500 mm², which corresponds to from approximately 0.017 mg/m² to 0.274 mg/mm².

The trend lines $Y = K \cdot X + L$ for the blends were measured, were Y is the joint width, K is the inclination of the line, X is the applied amount of blend and L is a constant, see FIG. 15. Thus, the width of braze joint is:

$Y$ (width for $A3.3$)=1.554+9.922·(applied amount of blend $A3.3$)

$Y$ (width for $B2$)=0.626+10.807·(applied amount of blend $B2$)

$Y$ (width for $C1$)=0.537+8.342·(applied amount of blend $C1$)

$Y$ (width for $F0$)=0.632+7.456·(applied amount of blend $F0$)

As observed from the diagram blends A3.3 out of blends A3.3, B2, C1, D0.5, E0.3 and F0 give the highest amount of braze alloy in the joint as a function of applied amount of blend. Sample F0 did not give any substantial joints below 0.20 gram per 3500 mm².

The trend lines $Y = K \cdot X - L$ for the blends were measured, Y is the area, K is the inclination of the line, X is the applied amount of blend and L is a constant, see FIG. 16.

$Y$ (area for $A3.3$)=4.361·(applied amount of blend $A3.3$)−0.161

$Y$ (area for $B2$)=3.372·(applied amount of blend $B2$)−0.318

$Y$ (area for $C1$)=2.549·(applied amount of blend $C1$)−0.321

$Y$ (area for $F0$)=0.569·(applied amount of blend $F0$)−0.093

An estimation on the created volume based on the diagram in FIG. 16 for e.g. an amount of 0.18 gram per 3500 mm², excluding sample F0, due to "no" braze joints and sample D0.5 due to too little data, gives a value for the samples for created volume of braze alloy in the joint between the two beams, see below.

Volume ($A3.3$)=0.63·length 40 (20·2)=25.2 mm³

Volume ($B2$)=0.30·length 40 (20·2)=12.0 mm³

Volume ($C1$)=0.12·length 40 (20·2)=4.8 mm³

Volume ($E0.3$)=0.10·length 40 (20·2)=4.0 mm³

Also, blends with higher proportion of boron were tested, e.g. sample G15, H100, I66 and J. The tested samples did work quite similar to blend A3.3 and B2 regarding the created braze alloy volume. However the metallurgical cross-section of the brazed samples showed that the amount of borides was greater and for sample H100, i.e. pure boron, also brittle high chromium phases were found on the surface where the blend earlier was applied. The hard phases were most probably chromium borides, which decreases the chromium content in the surrounding material, decreasing the corrosion resistance. This may be an issue when good corrosion resistance is wanted but is not an issue for non-corrosive environments. The effect of boron could be decreased by changing the heat treatment and or by using a thicker parent metal that can "absorb" a greater amount of boron. For a thicker material ≥1 mm this effect in the surface will also be less severe since the proportion of the surface volume compared to the parent metal volume is much less than for a thin material <1 mm or <0.5 mm. The chromium borides could be an advantage if better wear resistance is wanted. The metallurgical investigation also showed that for sample F0, i.e. pure silicon, a thick brittle silicon containing phase was found, with a thickness of >50% of the plate thickness for some areas in the investigated sample. The similar phase was also found in the joint. Cracks were found in this phase, with a length >30% of the plate thickness. Such cracks will decrease the mechanical performance of the joined product and can be initiating points for corrosion and or fatigue cracks. The average measured hardness of the phase was over 400 Hv (Vickers). This brittle phase is probably may be harder to decrease, compared to the by boride phase, using thicker parent metal or a change in heat treatment. Still for thicker parent metal this effect can be less severe.

Example 6

Example 6 concerns tensile tests of the joints. Then test plates corresponding to those used in Example 3 were sliced into slices. The size of the sliced samples was approximately 10 mm wide, 180 to 200 mm long and has a thickness of 0.4 mm. The applied area for each slice was then 10 mm times 35 mm=350 mm². On the applied area a thicker part, 4 mm, of stainless steel type 316L was placed covering 30 mm of the total 35 mm applied surface. The thicker part was placed at the end of the slice leaving 5 mm of applied surface not covered by the thick plate. By doing this a decrease in the plate material strength due to the applied blend would be detected when tensile testing if the joint is stronger than the plate. The thicker plate was also wider than the 10 mm slices. All test samples were brazed (heated) at approximately 1200° C. for approximately 1 hour.

After heating the thick part was mounted horizontally in a tensile test machine. The slice was firmly bent to 90° to a vertical direction. The samples were mounted so that they could move in horizontal direction. The samples were then loaded and the joint were split.

When the plate was stronger than the joint, so that the joint were split, the result was set to zero. For the samples that the joint were stronger than the plate material the difference in results was not statistical significant. The results are shown as percent (%) of the tested samples where the joint were stronger than or the same as the plate as a function of applied amount, meaning that the joint was not split when tested. The results are summarized in Table 10 and in the diagram of FIG. 17.

TABLE 10

| Blend of Si + B [gram] | Blend A3.3-1 Success Rate [%] | Blend B2-1 Success Rate [%] | Blend C1-1 Success Rate [%] | Blend D0.5-1 Success Rate [%] |
|---|---|---|---|---|
| 0.0600 | 100 | | | |
| 0.0910 | 100 | | | |
| 0.0989 | | 83 | | |
| 0.1092 | | 100 | | |
| 0.1196 | | | | 0 |
| 0.1309 | | | 50 | |
| 0.1399 | 100 | | | |
| 0.1402 | | | 50 | |
| 0.1428 | | | | 0 |
| 0.1500 | | 100 | | |
| 0.1548 | | | 67 | |
| 0.1558 | | 100 | | |
| 0.1800 | | 100 | | |
| 0.1850 | | | | 50 |
| 0.2200 | | 100 | | |
| 0.2417 | | | 100 | |
| 0.3000 | 100 | | | |
| 0.3300 | | | | 100 |

Example 7

To establish the relationship between applied amount of blend and the risk for creating holes through the plates, new tests were performed. For all tests blend B2, see Table 6, was used. Blend B2 comprises also binder S-30. The test pieces which were tested were circular having a thickness of 0.8 mm and having a diameter of 83 mm. The parent metal in the test plates were stainless steel type 316. For all samples the blend was applied in the center of the test sample. The applied area was 28 mm², i.e. circular spot having a diameter of 6 mm. All test samples were weighted before and after application, and the results are summarized in Table 11. Thereafter the test samples were placed in a furnace at room temperature for 12 hours. The samples were weighted again.

The test samples were all put in a furnace and were heated (also referred to as "brazed") at 1210° C. for approximately 1 hour. During brazing only the outer edges of each sample were in contact with the fixture material, keeping the plate center bottom surface not in contact with any material during brazing. The reason for keeping the plate center bottom surface free of contacts is that a collapse or a burn through might be prevented if the center material is supported from below by the fixture material.

Applied amount and burn through results for the 0.8 mm samples are summarized in Table 11.

TABLE 11

| Sample No. | Blend of Si + B and additional wet binder S-30 [gram] | Blend of Si + B and additional wet binder S-30 [mg/mm²] | Blend of Si + B and additional dried binder S-30 [mg/mm²] | Calculated amount of Blend of Si + B without binder [mg/mm²] | Burn through [1] or [0] |
|---|---|---|---|---|---|
| 1 | 0.020 | 0.714 | 0.464 | 0.453 | 0 |
| 2 | 0.010 | 0.357 | 0.232 | 0.226 | 0 |
| 3 | 0.040 | 1.429 | 0.928 | 0.905 | 0 |
| 4 | 0.030 | 1.0714 | 0.696 | 0.679 | 0 |
| 5 | 0.050 | 1.786 | 1.161 | 1.132 | 0 |
| 6 | 0.060 | 2.143 | 1.393 | 1.359 | 0 |
| 7 | 0.070 | 2.500 | 1.625 | 1.585 | 0 |
| 8 | 0.080 | 2.857 | 1.857 | 1.811 | 0 |
| 9 | 0.090 | 3.214 | 2.089 | 2.037 | 0 |
| 10 | 0.100 | 3.571 | 2.321 | 2.264 | 0 |
| 11 | 0.110 | 3.928 | 2.554 | 2.491 | 1 |
| 12 | 0.120 | 4.285 | 2.786 | 2.717 | 1 |
| 13 | 0.130 | 4.642 | 3.018 | 2.943 | 1 |
| 14 | 0.150 | 5.357 | 3.482 | 3.396 | 1 |
| 15 | 0.170 | 6.071 | 3.946 | 3.849 | 1 |
| 16 | 0.190 | 6.786 | 4.411 | 4.302 | 1 |
| 17 | 0.210 | 7.500 | 4.875 | 4.755 | 1 |
| 18 | 0.230 | 8.214 | 5.339 | 5.207 | 1 |
| 19 | 0.280 | 10.000 | 6.500 | 6.339 | 1 |
| 20 | 0.290 | 10.357 | 6.732 | 6.566 | 1 |

The tests show that there is a burn (hole) through between sample 10 and 11 for a plate having a thickness of 0.8 mm. Sample 10 has 2.264 mg/mm² applied amount of blend and sample 11 has 2.491 mg/mm². For joining plates having thickness less than 1 mm, there is a risk with an amount within the range from about 2.830 mg/mm² to about 3.114 mg/mm² for burning through the plates, the amount in the middle of this range is 2.972 mg/mm². Therefore, for a plate having a thickness less than 1 mm an amount of less than 2.9 mg/mm² would be suitable for avoiding burning through the plate.

Example 8

In Example 8a braze joint between two pressed heat exchanger plates are made in three different ways. The thickness of the heat exchanger plates are 0.4 mm.

In the first and second test samples an iron-based braze filler with a composition close to stainless steel type 316 was used. See WO 2002/38327 for the braze filler. The braze filler had an increased amount of silicon to about 10 wt %, an amount boron to about 0.5 wt % and a decreased amount of Fe of about 10.5 wt %. In the first test sample the braze filler was applied in lines and in the second test sample the braze filler was applied evenly on the surface. In both cases the filler was applied after pressing.

Brazing test sample 1 showed that the braze filler applied in lines was drawn to the braze joints. Some of the braze filler did not flow to the braze joint and therefore increased the thickness locally at the applied line. For test sample 2 the braze filler flowed to the braze joints, however some on the braze filler remained on the surface and increased the thickness. In test samples 1 and 2 the amount of braze filler corresponds to an amount of approximately 15 wt % of the plate material.

In test sample 3 the A3.3 blend was used, see Table 6. The blend was applied before pressing evenly on the plate. The blend was applied in an amount that would create braze joint with similar sizes as for test samples 1 and 2.

Test sample 3 was applied with a layer having a thickness corresponding to a weight of approximately 1.5 wt % of the plate material. By applying blend A3.3 a braze alloy was formed from the parent metal (metal part), and the formed braze alloy flow to the braze joints. Accordingly, the thickness of the plate decreased since more material was drawn to the braze joint than added blend on the surface.

Example 9

Example 9 concerns tests with different boron and silicon sources. The purpose was to investigate alternative boron sources and silicon sources. Blend B2, see Table 6, was selected as reference for the tests. The alternative sources were tested in respect of their ability to create a joint. For each experiment either an alternative boron source or an alternative silicon source was tested. When using an alternative source the other element influence was assumed to be zero, meaning that it was only the weight of boron or silicon in the alternative component that was "measured", see Table 12. For the reference blend B2, the weight ratio between silicon and boron is 10 gram to 2 gram summing up to 12 gram. Each blend included S-30 binder and the blend was applied on a steel plate according to Example 1. All samples were brazed in a vacuum furnace at 1210° C. for 1 hour.

TABLE 12

| Sample | Alternative source | Added Amount [Si] [gram] | Added Amount [B] [gram] | Corresponding Amount [Si] [gram] | Corresponding Amount [B] [gram] |
|---|---|---|---|---|---|
| Si—B | Si—B | 10.0 | 2.0 | 10.0 | 2.0 |
| Si—B$_4$C | B$_4$C | 10.0 | 2.6 | 10.0 | 2.0 |
| Si—FeB | FeB | 10.1 | 12.5 | 10.1 | 2.0 |
| FeSi—B | FeSi | 30.2 | 2.0 | 10.1 | 2.0 |
| Si—NiB | NiB | 10.1 | 13.0 | 10.1 | 2.0 |

The trend line Y=K·X+L for blend B2 was measured, Y is the joint width, K is the inclination of the line for B2, X is the applied amount of blend and L is a constant for no applied amount of blend B2, see FIG. 15. Thus, the width of braze joint Y=0.626+10.807·(applied amount of blend).

In Table 13 v and h stand for v=left beam and h=right beam as in Example 5.

TABLE 13

| Sample | Applied Amount [gram] | Joint Calculated Width Y [mm$^2$] | Joint Measured Width [mm$^2$] |
|---|---|---|---|
| Si—B$_4$C-v | 0.22 | 3.0 | 2.69 |
| Si—B$_4$C-h | 0.22 | 3.0 | 2.88 |
| Si—FeB-v | 0.26 | 3.4 | 1.73 |
| Si—FeB-h | 0.26 | 3.4 | 1.73 |
| FeSi—B-v | 0.29 | 3.8 | 2.1 |
| FeSi—B-h | 0.29 | 3.8 | 2.1 |
| Si—NiB-v | 0.39 | 4.8 | 2.69 |
| Si—NiB-h | 0.39 | 4.8 | 2.88 |

The results in Table 13 show that it is possible to use B4C, NiB and FeB as alternatives source to boron. When NiB were used the created amount was less than for pure boron. However, NiB could be used if an Ni alloying effect is wanted.

Example 10

In Example 10a large number of different parent metals were tested, i.e. metals that may be used for the metal parts 11 and 12 of FIG. 1. All tests except for the mild steel and a Ni—Cu alloy were tested according to "test Y" (see below).

For test Y two circular pressed test pieces with a thickness of approximately 0.8 mm were placed onto each other. Each sample had a pressed circular beam. The top faces of the beams were placed towards each other creating a circular crevice between the pieces. For each sample the B2 blend, which in this example comprises binder S-20, was applied with a paint brush. The weight of the added amount of blend was not measured since the applying was not homogenous when applying with the paint brush. A picture of one of the samples after joining is presented in FIG. 18.

The mild steel samples and the Ni—Cu samples were applied in the same way, but for mild steel according to the tests made in example 5 "fillet test" and for the Ni—Cu test with two flat test pieces. The samples except for the Ni—Cu were "brazed" in a furnace at approximately 1200° C., i.e. 1210° C., for 1 h in vacuum atmosphere furnace. The Ni—Cu sample was brazed at approximately 1130° C. for approximately 1 h in the same vacuum furnace. After "brazing" a joint was formed between the pieces for all tests. A flow of created "braze alloy" (made of the parent metal) to the joint was also observed for all tested samples. The results are shown on Table 14.

TABLE 14

| Parent metal Sample No. | Cr [wt %] | Fe [wt %] | Mo [wt %] | Ni [wt %] | Cu [wt %] | Mn [wt %] | After Brazing Created joint? | After Brazing Flow of Brazing Alloy? |
|---|---|---|---|---|---|---|---|---|
| 1 | — | 0.3 | — | 99 | — | 0.2 | Yes | Yes |
| 2 | 21 | 0.6 | 16 | 62 | 0.4 | — | Yes | Yes |
| 3 | 22 | 0.7 | 16 | 59 | 1.6 | — | Yes | Yes |
| 4 | 0.6 | 1.9 | 29 | 68 | 0.2 | — | Yes | Yes |
| 5 | 21 | 4.4 | 13 | 58 | — | — | Yes | Yes |
| 6 | 19 | 5.0 | 9.0 | 63 | 0.4 | — | Yes | Yes |
| 7 | 15 | 5.5 | 17 | 60 | — | 0.3 | Yes | Yes |
| 8 | 1.1 | 5.6 | 28 | 63 | 0.6 | 0.4 | Yes | Yes |
| 9 | 19 | 6.2 | 2.6 | 70 | 1.7 | 0.4 | Yes | Yes |
| 10 | 33 | 32 | 1.7 | 33 | 0.4 | 0.6 | Yes | Yes |
| 11 | 27 | 33 | 6.5 | 32 | 1.1 | 1.4 | Yes | Yes |
| 12 | 27 | 36 | 3.4 | 32 | 1.0 | 1.4 | Yes | Yes |
| 13 | 24 | 44 | 7.2 | 23 | 0.3 | 1.5 | Yes | Yes |
| 14 | 20 | 48 | 4.3 | 25 | 1.1 | 1.2 | Yes | Yes |
| 15 | 19 | 50 | 6.3 | 25 | 0.2 | — | Yes | Yes |

TABLE 14-continued

| Parent metal Sample No. | Cr [wt %] | Fe [wt %] | Mo [wt %] | Ni [wt %] | Cu [wt %] | Mn [wt %] | After Brazing Created joint? | After Brazing Flow of Brazing Alloy? |
|---|---|---|---|---|---|---|---|---|
| 16 | 20 | 54 | 6.5 | 19 | 0.6 | 0.4 | Yes | Yes |
| 17 | 29 | 64 | 2.4 | 3.5 | — | — | Yes | Yes |
| 18 | 28 | 66 | 2.2 | 3.5 | — | — | Yes | Yes |
| 19 | 0.3 | 1.1 | — | 66 | 31 | 1.6 | Yes | Yes |
| 20 | 0.17 | 99.5 | — | — | — | 0.3 | Yes | Yes |

The results in Table 14 show that braze alloys are formed between the blend and the parent metal for each sample 1 to 20. The results show also that joints were created for each tested sample.

The examples show that boron was needed to create substantial amount of braze alloy, which could fill the joints and also create strength in the joints. The examples also showed that boron was needed for the microstructure, since a thick fragile phase was found for the samples with no boron.

From above follows that the parent metal, i.e. the metal parts described in connection with e.g. FIG. 1, may be made of an alloy comprising elements such as iron (Fe), chromium (Cr), nickel (Ni), molybdenum (Mo), manganese (Mn), copper (Cu), etc. Some examples of alloys to be used for the metal parts are found in the list in Table 15.

TABLE 15

| Parent metal (metal parts) | Approximate. solidus temperature [° C.] | Approximate. liquidus temperature [° C.] |
|---|---|---|
| Nickel 200/201 | 1435 | 1445 |
| Nicrofer 5923hMo | 1310 | 1360 |
| Hastelloy ® C-2000 ® Alloy | 1328 | 1358 |
| Hastelloy B3 | 1370 | 1418 |
| Alloy C22 | 1357 | 1399 |
| Inconel 625 | 1290 | 1350 |
| Alloy C 276 | 1325 | 1370 |
| Nicrofer 3033 | 1330 | 1370 |
| Nicrofer 3127HMo | 1350 | 1370 |
| AL6XN | 1320 | 1400 |
| 254SMO | 1325 | 1400 |
| Monel 400 | 1299 | 1348 |
| Pure Cu | 1085 | 1085 |
| Mild steel | 1505 | 1535 |
| Stainless steel Type 316 | 1390 | 1440 |
| Stainless steel type 304 | 1399 | 1421 |

The blend, i.e. the melting depressant composition, may be applied by painting as described above. The blend may also be applied by means such as physical vapor deposition (PVD), or chemical vapor deposition (CVD), in which case the blend does not need to include a binder component. It is possible to apply the silicon in on layer and the boron in one layer, by painting or by PVD or CVD. Still, even if applied in layers both the boron and the silicon is considered to be included in the melting depressant composition since they will interact during the heating, just as if they were mixed before the applying.

Method

Figure 19:
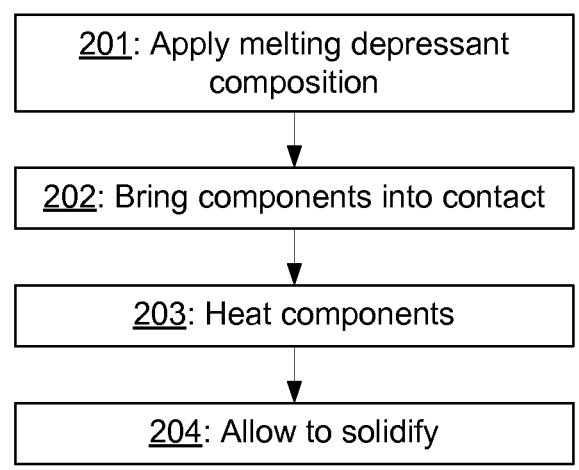
FIG. 19 is a flow chart of a method for joining a first and second metal part.

With reference to FIG. 19 a flow chart of a method for joining a first and second metal part is illustrated. The metal parts may be made of different materials as described above.

In a first step 201 the melting depressant composition is applied on the surface of one of the metal parts (here the first metal part). The application per se may be done by conventional techniques, e.g. by spraying or painting in case the melting depressant composition comprises a binder component, and by PVD or CVD in case not binder component is used.

A next step 202 the second metal part is brought into contact with the melting depressant composition at a contact point on the surface. This can be done manually or automatically by employing conventional, automated manufacturing systems.

In a next step 303 the metal parts are heated to a temperature which is above 1100° C. The exact temperature can be found the examples above. During the heating a surface of at least the first metal part melt and, together with the melting depressant component, forms a melted metal layer that is in contact with the second metal part at the contact point between the first metal part and the second metal part. When this happen, metal of the melted metal layer flows towards the contact point.

A final step 204 the melted metal layer is allowed to solidify, such that a joint is obtained at the contact point, i.e. the metal that has flown to the contact point solidifies. The solidification typically includes decreasing temperature to normal room temperature. However, solidification also occurs during the physical process of redistribution of components (boron and silicon) in the joint area, before a temperature is decreased.

From the description above follows that, although various embodiments of the invention have been described and shown, the invention is not restricted thereto, but may also be embodied in other ways within the scope of the subject-matter defined in the following claims. Various melting depressant compositions can also be combined with various metals for the metal parts. For example, melting depressant composition (blend) A3.3 may be combined with metal parts made of 316 steel.

The invention claimed is:

1. A method for joining a first metal part with a second metal part, the metal parts having a solidus temperature above 1100° C., the method comprising:
applying only a melting depressant composition on a surface of the first metal part, the melting, depressant composition comprising a melting depressant component that comprises at least 25 wt % boron and silicon of the melting depressant composition for decreasing a melting temperature of the first metal part and optionally at least one metallic element, wherein any metallic element, if present, is part of the melting depressant component, and optionally, a binder component for facilitating the applying of the melting depressant composition on the surface, wherein the first metal part comprises a thickness of 0.3-1.0 mm and said applying of the melting depressant composition comprises applying an average of 0.04-1.0 mg boron and silicon per mm$^2$ on the surface of the first metal part, bringing the second metal part into contact with the melting depressant composition at a contact point on said surface of the first metal part, after bringing the second metal part into contact with the melting depressant composition heating the first and second metal parts to a temperature above 1100° C., thereby melting the melting depressant composition and a surface layer of the first metal part, which, together with the melting depressant component, forms a incited metal layer that is in contact with the second metal part at the contact point, and allowing the melted metal layer to solidify, such that a joint is obtained at the contact point.

2. The method according to claim 1, wherein the boron originates from any of elemental boron and boron of a boron compound selected from at least any of the following compounds: boron carbide, silicon boride, nickel boride and iron boride.

3. The method according to claim 1, wherein the silicon originates from any of elemental silicon and silicon of a silicon compound selected from at least any of the following compounds: silicon carbide, silicon boride and ferrosilicon.

4. The method according to claim 1, wherein the melting depressant component comprises at least 40 wt % boron and silicon.

5. The method according to claim 1, wherein the melting depressant component comprises at least 85 wt % boron and silicon.

6. The method according to claim 1, wherein boron constitutes at least 10 wt % of the boron and silicon content of the melting depressant component.

7. The method according to claim 1, wherein silicon constitutes at least 55 wt % of the boron and silicon content of the melting depressant component.

8. The method according to claim 1, wherein the metallic elements are less than 75 wt % of the melting depressant component.

9. The method according to claim 1, wherein the metallic elements are less than 10 wt % of the melting depressant component.

10. The method according to claim 1, wherein the surface has an area that is larger than an area defined by the contact point on said surface, such that metal in the melted metal layer flows to the contact point when allowing the joint to form.

11. The method according to claim 10, wherein the area of the surface is at least 10 times larger than the area defined by the contact point.

12. The method according to claim 10, wherein the area of the surface is at least 3 times larger than a cross-sectional area of the joint.

13. The method according to claim 1, wherein the joint comprises at least 50 wt % metal that, before the heating, was part of any of the first metal part and the second metal part.

14. The method according to claim 1, wherein any of the first metal part and the second metal part comprises a plurality of protrusions that extend towards the other metal part, such that, when bringing the second metal part into contact with said surface, a plurality of contact points are formed on said surface.

15. The method according to claim 1, wherein the first metal part comprises >50 wt % Fe, <13 wt % Cr, <1 wt % Mo, <1 wt % Ni and <3 wt % Mn.

16. The method according to claim 1, wherein the first metal part comprises >90 wt % Fe.

17. The method according to claim 1, wherein the first metal part comprises >65 wt % Fe and >13 wt % Cr.

18. The method according to claim 1, wherein the first metal part comprises >50 wt % Fe, >15.5 wt % Cr and >6 wt % Ni.

19. The method according to claim 1, wherein the first metal part comprises >50 wt % Fe, >15.5 wt % Cr, 1-10 wt % Mo and >8 wt % Ni.

20. The method according to claim 1, wherein the first metal part comprises >97 wt % Ni.

21. The method according to claim 1, wherein the first metal part comprises >10 wt % Cr and >60 wt % Ni.

22. The method according to claim 1, wherein the first metal part comprises >15 wt % Cr, >10 wt % Mo and >50 wt % Ni.

23. The method according to claim 1, wherein the first metal part comprises >70 wt % Co.

24. The method according to claim 1, wherein the first metal part comprises >10 wt % Fe, 0.1-30 wt % Mo, 0.1-30 wt % Ni and >50 wt % Co.

* * * * *